US012752510B2

(12) United States Patent
Bartlett et al.

(10) Patent No.: US 12,752,510 B2
(45) Date of Patent: Oct. 6, 2026

(54) PROGRAMMABLE ADHESION USING NONLINEAR KIRIGAMI STRUCTURES

(71) Applicant: Iowa State University Research Foundation, Inc., Ames, IA (US)

(72) Inventors: Michael D. Bartlett, Blacksburg, VA (US); Dohgyu Hwang, Blacksburg, VA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 220 days.

(21) Appl. No.: 18/420,396

(22) Filed: Jan. 23, 2024

(65) Prior Publication Data

US 2024/0157671 A1 May 16, 2024

Related U.S. Application Data

(62) Division of application No. 17/248,351, filed on Jan. 21, 2021, now Pat. No. 11,904,585.

(Continued)

(51) Int. Cl.

*B32B 3/26* (2006.01)
*B32B 7/06* (2019.01)

(Continued)

(52) U.S. Cl.

CPC ................ *B32B 3/266* (2013.01); *B32B 7/06* (2013.01); *B32B 25/08* (2013.01); *B32B 25/20* (2013.01);

(Continued)

(58) Field of Classification Search

CPC ............ B32B 2405/00; B32B 2250/03; B32B 25/20; B32B 25/08; B32B 7/06; B32B 3/266; Y10T 428/24314; Y10T 428/24281

See application file for complete search history.

(56) References Cited

U.S. PATENT DOCUMENTS 4,335,172 A * 6/1982 Sato .......................... G09F 3/10 206/820
5,130,185 A 7/1992 Ness (Continued)

FOREIGN PATENT DOCUMENTS

WO 2018074447 A1 4/2018

OTHER PUBLICATIONS

Machine translation of WO-2018074447-A 1. (Year: 2018).

(Continued)

*Primary Examiner* — Vishal I Patel
(74) *Attorney, Agent, or Firm* — McKee, Voorhees & Sease, PLC

(57) ABSTRACT

The invention relates to an adhesive system comprising a fabricated structure having alternating regions that are unpatterned and patterned along its longitudinal length. Patterned regions have at least one subregion with a non-linear cut relative to the transverse direction across the width of the structure. The geometry, location of the subregion(s), number of nonlinear cuts, and other parameters allow tuning as well as pinpoint programming of the adhesive properties either along the entire width and length or the strip or just at pinpointed subregions of the strip. Such tuning can include not only adhesive strength, but its adhesive strength in certain peeling directions.

39 Claims, 30 Drawing Sheets
(29 of 30 Drawing Sheet(s) Filed in Color)

Related U.S. Application Data

(60) Provisional application No. 62/963,787, filed on Jan. 21, 2020.

(51) Int. Cl.
*B32B 25/08* (2006.01)
*B32B 25/20* (2006.01)

(52) U.S. Cl.
CPC ....... *B32B 2250/03* (2013.01); *B32B 2405/00* (2013.01); *Y10T 428/24281* (2015.01); *Y10T 428/24314* (2015.01)

(56) References Cited

U.S. PATENT DOCUMENTS

| | | | |
|---|---|---|---|
| 5,705,245 | A | 1/1998 | Loemker et al. |
| 9,419,502 | B2 | 8/2016 | Veronesi et al. |
| 10,435,590 | B2 | 10/2019 | Wolk et al. |
| 10,927,277 | B2 | 2/2021 | Krull et al. |
| 11,078,383 | B2 | 8/2021 | Krull et al. |

OTHER PUBLICATIONS

Kendall, K., “Thin-film peeling—the elastic term”, J. Phys. D: Appl. Phys., vol. 8, pp. 1449-1452, 1975.

Hwang et al., “Kirigami-Inspired Structures for Smart Adhesion”, ACS Applied Materials & Interfaces, vol. 10, 11 pages, Jan. 23, 2018.

* cited by examiner f

R1

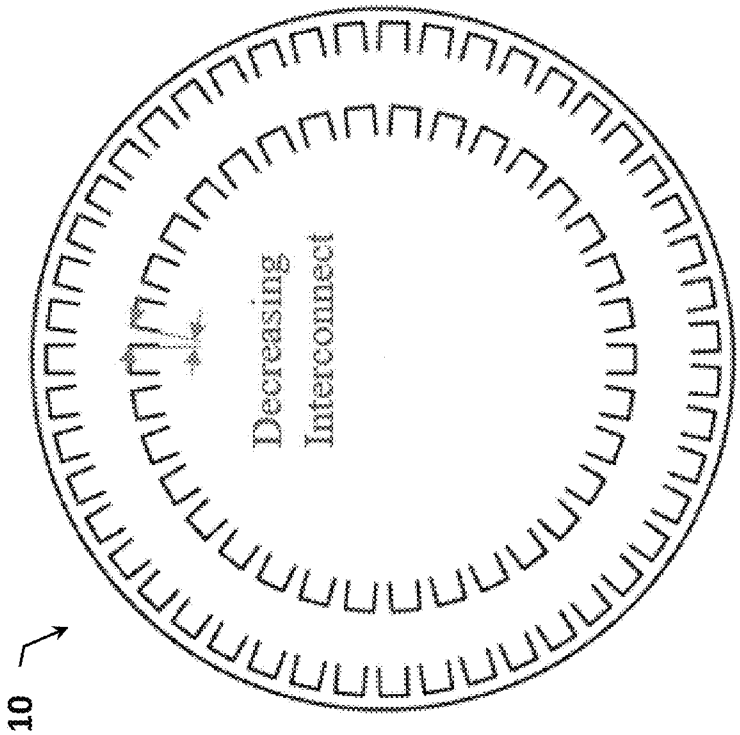
FIG. 7B -- Type 2 – Square pattern
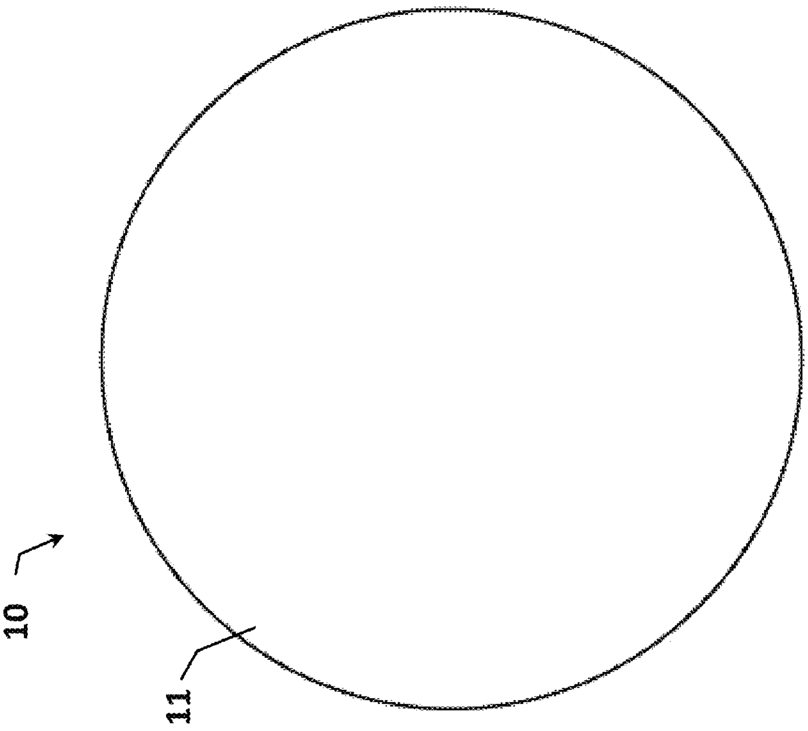
FIG. 7A --Type 1 - Plain

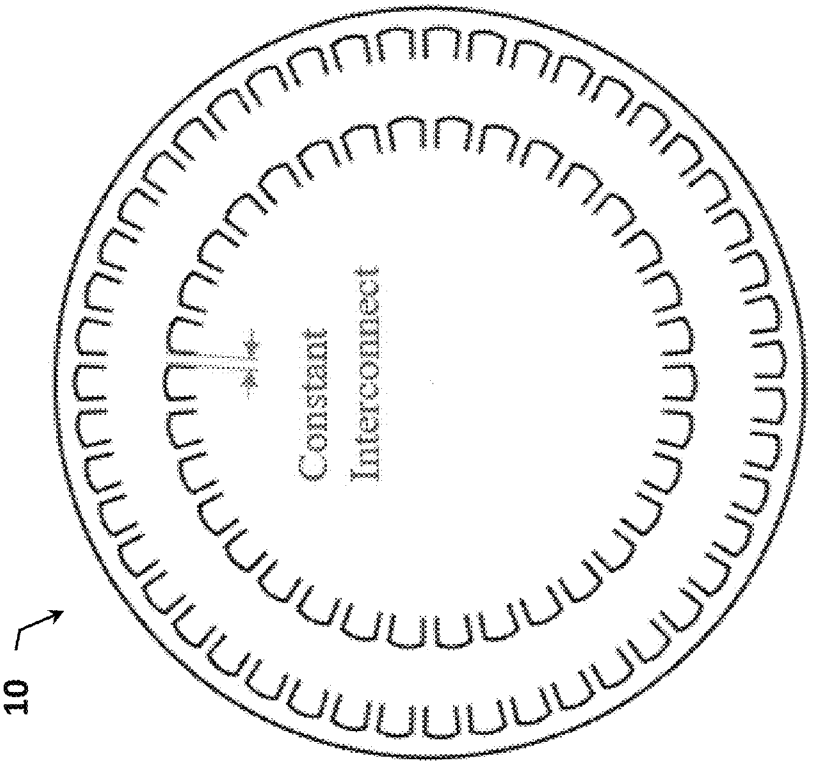
FIG. 7C -- Type 3 – pentagon pattern (Constant interconnect)
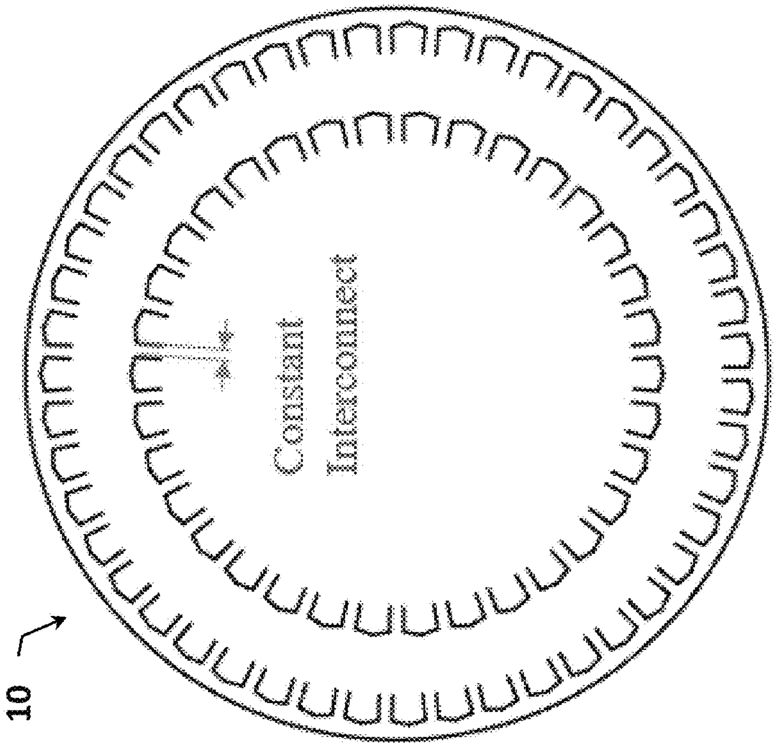
FIG. 7D -- Type 4 – Round top pattern (Constant interconnect)

PROGRAMMABLE ADHESION USING NONLINEAR KIRIGAMI STRUCTURES

CROSS REFERENCE TO RELATED APPLICATION

This application is a Divisional application of U.S. Ser. No. 17/248,351, filed Jan. 21, 2021, which claims the benefit of Provisional Application U.S. Ser. No. 62/963,787 filed on Jan. 21, 2020, all of which are herein incorporated by reference in their entireties.

BACKGROUND OF THE INVENTION

Field of the Invention

The present invention relates to adhesive structures or assemblies in the form of a strip, film, sheet, or tape having length and width greater than thickness, and in particular, to regions that have non-linear cuts to enhance and tune adhesive properties of the structure or assembly.

Problems in the State of the Art

The technological field of adhesive films, tapes, and the like is an area of great interest to a variety of industries and commercial endeavors. From such things such as a Post-it® notes to medical bandages to wearable patches, a variety of approaches have been proposed.

Of particular interest is releasable/reusable adhesive structures. The Post-it note paradigm has been transformative in allowing notes to be placed on paper or other surfaces, and then removed and reused at least a substantial number of times. This is also at least substantially done without leaving more than negligible residue on the target surface. Adhesive strength of Post-Its® is sufficient to maintain adhesion at least over most events or forces that will be experienced by the adhered note or sheet in normal use.

The search for improvements continues, including ways to enhance or vary such things as adhesive strength, usability cycles, amount and direction of force needed to release either the entire adhesive structure or to have spatial variations across the adhesive structure. Furthermore, work is ongoing in creating fabrication methods that are scalable, economical, and efficient for versatile adhesives.

One example of such work associated out of the same group as the present invention is described in Doh-Gyu Hwang, Katie Trent, and Michael D. Bartlett, Kirigami-Inspired Structures for Smart Adhesion, *ACS Applied Materials & Interfaces* 2018 10 (7), 6747-6754. DOI: 10.1021/acsami.7b18594, and Supporting Information available on-line at ACS Publications website at DOI: 10.1021/acsami.7b18594, incorporated by reference herein, and commonly-owned, co-pending U.S. Ser. No. 16/748,442, filed Jan. 21, 2020, which claimed the benefit of U.S. Ser. No. 62/795,231, filed Jan. 22, 2019, which are incorporated by reference herein. Using scalable fabrication technologies, thin, flexible, but relatively inelastic films are patterned by cutting out portions of the film in what are called compliant regions along the length of the film. The compliant regions alternate with what are called rigid regions that do not have the same patterned cutouts. By engineering the cut out openings, the structure has adhesive properties that provide much higher adhesive properties along the longitudinal axis of the structure but lower adhesive properties, and thus easier release, in an orthogonal direction to that long axis. In one example, the cut out openings are rectangular with the long axis of the rectangular openings along the transverse direction of the structure. In some specific examples, kirigami-inspired cuts through the structure create the openings, but leave a continuous connectedness along the whole structure by stiff regions between sets of openings (compliant regions) and having one or more interconnects between adjacent stiff regions. Adhesive properties can be tuned by variations in shape, number, size, of the openings per compliant region or regions of the structure, as well as thickness of the structure and ratios between the opening form factors and the material of the structure framing the openings.

As discussed in *ACS Applied Materials & Interfaces* 2018 10 (7), 6747-6754 and U.S. Ser. No. 16/748,442, this highly scalable, economical and efficient way of fabricating patterned strip, sheet, or film adhesive structures, by controlling the cutting in terms of open areas, shape of open areas, size of open areas, etc., can enhance adhesive strength against peeling in opposite directions along the length of the film but present less adhesive strength and, thus, allow easier release and removal in an orthogonal or transverse directions of the film. The physics of these functions is explained in *ACS Applied Materials & Interfaces* 2018 10 (7), 6747-6754 and U.S. Ser. No. 16/748,442. Patterned cuts to remove portions to create shaped openings can be accomplished by a variety of subtractive techniques (e.g. cutting, stamping, punching, etc.). It is possible to build the structure additively too (e.g. by inkjet printing or other assembly methods). As such, working with thin layered materials, a variety of scalable fabrication techniques are available to make end products with one or more functionalities. As described in *ACS Applied Materials & Interfaces* 2018 10 (7), 6747-6754 and U.S. Ser. No. 16/748,442, the form factors of the cut-out openings can vary.

As can be appreciated, adhesive strips such as patches, bandages, and the like need to be flexible so that they can be rolled on or peeled off, including from non-planar target surfaces and from target surfaces of different materials. Typically, their structure must be robust enough to resist deformation or destruction from bendings and flexures from typical forces and uses of such adhesive structures. Thus, there are a number of parameters, some of them antagonistic with each other, relative to designing an adhesive strip, film, or sheet.

The inventors have developed further concepts regarding use of cuts in an adhesive strip structure that provide both similar and additional benefits to the concepts of *ACS Applied Materials & Interfaces* 2018 10 (7), 6747-6754 and U.S. Ser. No. 16/748,442, as discussed herein. The inventors have identified room for improvement in this technical field.

SUMMARY OF THE INVENTION

Objects, Features, Advantages of the Invention

It is a primary object, feature, or advantage of the present invention to provide apparatus, methods, and systems that improve over or solve problems and deficiencies in the state-of-the-art.

Another object, feature, or advantage of the present invention is to provide apparatus, methods, systems for an adhesive strip structure which can be engineered with programmable adhesive properties, both in transverse regions along its length and in subregions along any region. A variety of techniques can create nonlinear cuts at any subregion of the strip structure with high accuracy, precision, and scalability. One example is a digitally controlled cutting sub-system. One example of the cutting tool is a laser. With digital programming, and digital control of a laser, any of a wide variety of nonlinear cuts can be effectuated across a range of sizes of structure, including making non-linear cut patterns across a starting sheet of material, and then cutting discrete parts of the starting sheet into individual adhesive structures. This can even be relatively small scales (e.g. just a few millimeters). But it also can be scaled up or down. For example, this could be scaled down to 1 um (perhaps less) and up to cm scale at least (or more). There is no theoretical limit to the scale of the non-linear cuts. Cuts on the meter scale, or tens of meters scale, or even larger are indicated to have at least some improvement in adhesive characteristics versus linear cuts or no cuts. But as a practical matter, current testing indicates the magnitude of such improvements may decrease at and above one meter or so. In other words, the efficiency of the adhesive properties may decrease above that scale. By empirical testing, the efficiency of a non-linear cut for a given substrate can allow a designer to decide if a given efficiency is acceptable for a given substrate and its intended applications. As will be appreciated, the size of the non-linear cuts can depend on the material into which they are patterned.

Similarly, there is no theoretical limit as to smallest scale of the non-linear cuts. It is possible, given appropriate other factors such as thickness of the strip/material in which the non-linear cuts are made and type of strip/material, a designer may decide there is a practical limit for a given application. But as shown by the following prophetic example, enhanced adhesion is indicated for non-linear cuts according to the invention at sub-micron non-linear cut lengths, and even into nanometer length scales. As is well-known, materials such as graphene or graphene-based materials can have thicknesses in the nanometer scale range, including one molecule thick. The invention can be applicable.

A further object, feature, or advantage of the invention is the ability to vary the non-linear cuts to not only enhance adhesive properties, but also directionality of adhesive properties. This can include directionality between opposite peel directions along the length or longitudinal axis of the structure.

A further object, feature, or advantage of the invention is an apparatus, method, system for fabricating adhesive strips that can be relatively economical, efficient, and scale of all.

A further object, feature, or advantage of the invention is the ability to program adhesive properties at any subregion along of the structure.

Aspects of the Invention

An aspect of the invention is an adhesive system comprising a fabricated structure having alternating regions that (a) have patterned cuts (sometimes "patterned regions") and (b) do not have such patterned cuts (sometimes "unpatterned regions") along its longitudinal length. Patterned regions have at least one subregion with a non-linear cut relative to the transverse direction across the width of the structure. The geometry, location of the subregion(s), number of nonlinear cuts, and other parameters allow tuning of the adhesive properties either along the entire width and length or the strip or just at pinpointed subregions of the strip. Such tuning can include not only adhesive strength, but its adhesive strength in one or more certain peeling directions. In one example, adhesive strength relative to a target surface can be substantially higher in a first peel direction but substantially lower in an opposite peel direction. The non-linear cuts in the patterned regions will sometimes be described as creating "flaps" in the material that are connected to unpatterned regions at places sometimes called "hinges". In contrast to the earlier work of *ACS Applied Materials & Interfaces* 2018 10 (7), 6747-6754 and U.S. Ser. No. 16/748,442, the stiffness of the patterned or unpatterned regions is not the driving factor. Rather, the "flap" nature of the cut patterned region makes the crack have to turn around to detach. This lowers the peel angle and this increases the force.

In another aspect of the invention, a method of fabricating an adhesive system or structure as described above includes the ability of forming a layered structure having a first layer with the patterned and unpatterned regions and a second layer that is at least relatively adhesive. The nonlinear patterned cuts can be through the thickness of both layers but, if the adhesive layer was soft enough you may not need to cut it to be effective according to aspects of the invention. The alternating regions that are patterned and unpatterned can be designed and implemented in relatively inexpensive and easy to process materials. One non-limiting example is PET and PDMS.

A product made by the method described above is another aspect of the invention. The product can simply be an adhesive strip that has programmed adhesive properties. Alternatively, it could be both an adhesive strip but carry some added functionality. An example would be a sensor or other electrical circuit. Such could be applied by a variety of techniques to apply/fabricate/assembly electrical circuits on or to a flexible substrate. Other examples of possible applications and uses can be seen in *ACS Applied Materials & Interfaces* 2018 10 (7), 6747-6754 and U.S. Ser. No. 16/748,442.

These and other objects, features, aspects, and advantages of the invention will become more apparent with reference to the company specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A is a top plan view illustration of a first example variation according to Specific Embodiment 1 in a relatively flat position, where the strip has fourteen patterned regions between unpatterned regions, each patterned region with eight sub-regions.

FIG. 1B is a slightly enlarged, partial view of one end of the strip of FIG. 1A illustrating a first adhesive state in a first peel direction.

FIG. 1C is a slightly enlarged, partial view of an opposite end of the strip of FIG. 1A illustrating a second adhesive state in a second, opposite peel direction to the first peel direction of FIG. 1B.

FIG. 1D is a diagrammatic illustration of the first adhesion state for the first peel direction of FIG. 1B.

FIG. 1E is a diagrammatic illustration of the second adhesion state for the second peel direction of FIG. 1C.

FIG. 1F is a graph illustrating the data of FIGS. 1G-I.

FIGS. 1G, 1H, and 1I are diagrammatical illustrations of adhesive performance of several different non-limiting nonlinear cuts for a patterned material such as Specific Embodiment 1, as compared to either linear cuts or no cuts in the same or similar material, showing proof of concept for a variety of non-linear cut examples.

FIG. 1J is a picture of a test set-up used to demonstrate efficacy of Specific Embodiment 1.

FIG. 2A is a second example variation according to Specific Embodiment 1 where the strip has seven patterned regions between unpatterned regions, each patterned region with six sub-regions. The left-most illustration shows the strip in a flat position. The upper-right illustration is a diagrammatic illustration of sub-regions of the patterned regions of the strip. The lower-right illustration diagrammatically shows, not to scale, layers of the strip.

FIGS. 2B-E are graphs and diagrams showing proof of concept of the variation of FIG. 2A.

FIG. 2F is a diagrammatic illustration of further principles and characteristics of the non-linear cut pattern variation of FIG. 2A, including a comparison to an unpatterned same or similar material.

FIG. 3A is a diagram illustrating one example of fabricating strips according to aspects of the present invention. The technique allows for programmability of adhesive properties of the strip.

FIG. 3B-E are diagrams depicting non-limiting variations of different strips with different adhesive properties that can be fabricated with the technique of FIG. 3A.

FIG. 4A is a diagrammatic illustration of further possible variations in adhesive properties by programmed fabrication of patterned regions according to the invention.

FIG. 4B is a graph showing proof of concept of principles and characteristics of the examples of FIG. 4A.

FIG. 5A diagrammatically illustrates principles of this embodiment. FIG. 5B diagrammatically illustrates one example of patterning of the strip for bi-direction resistance to peeling and graphs showing proof of concept.

FIGS. 7A-D are examples of patch-type structures according to exemplary embodiments of the invention with example of different non-linear patterned cuts.

DETAILED DESCRIPTION OF EXEMPLARY EMBODIMENTS OF THE INVENTION

Overview

For a better understanding of the invention, examples will now be set forth in detail. It is to be understood that these examples are neither exclusive nor inclusive of all forms and embodiments the invention can take. For example, variations obvious to the skill in the art will be included within the invention.

Figure 11:
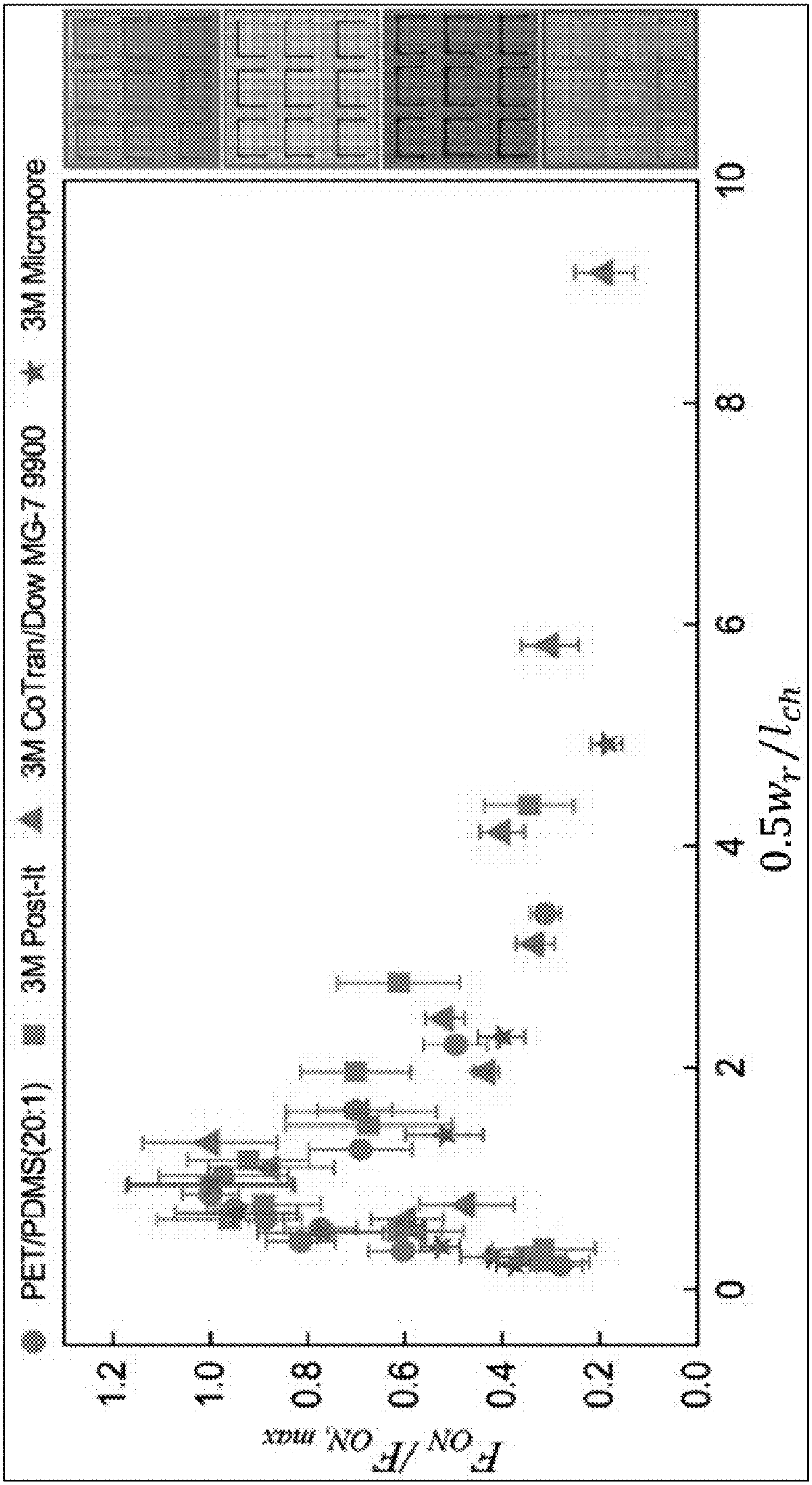
FIG. 11 is a graph similar to FIG. 2B but showing adhesive characteristics for a variety of non-limiting examples of materials into which non-linear cuts according to the present invention have been made (in these examples, rectangular cuts).

In at least several of these examples, the adhesive structure comprises a PET inelastic layer laminated on one side with a PDMS elastic/adhesive layer. The invention is not limited to those two materials or to that specific layered construction. Specific Example 1 below gives proof of concept of the broader aspects of the invention in the context of those materials. The aspects of the invention can be applied in analogous ways to other materials. FIG. 11 gives additional, non-limiting examples to show that the concept of patterned non-linear cuts of the invention can apply to and be effective for a wide range of materials.

Also, the term "nonlinear cut" is intended to have its ordinary meaning in the sense it is not a straight line between opposite termination points of the single cut. FIGS. 1F, 1G, 1H, and 1I give just a few non-limiting examples of non-linear cuts; namely a U-shaped (sometimes called rectangular) cut and a V-shaped (sometimes called triangular) cut, as well as what will sometimes be called a "hybrid" non-linear cut (top-most diagram to the left in FIGS. 1G, 1H, and 1I. For comparison, those, hybrid, U-, and V-shaped cuts are illustrated relative to a straight linear cut or no cuts (unpatterned), as are measured differences in adhesive properties of all four examples in a proof-of-concept test discussed in the Specific Example 1. In particular, the linear or straight cut (4th diagram down FIGS. 1G, 1H, and 1I) is essentially a straight linear slit between opposite termination points of the cut in a transverse direction of the strip through the strip's thickness. In comparison, the hybrid, U-shaped, or V-shaped nonlinear cuts have opposite termination points and then converge to either a point (in the case of converging to the peak of the triangle or V-shape in the hybrid cut or the triangle cut), or a linear intermediate cut section between opposite side cut sections (in the case of the U-shape). As will be understood, the non-linear cuts essentially create what will sometimes be called a hinge line between the opposite termination points of the nonlinear cut, as well as what will be called a flap area inside the boundaries of the cut sections and the hinge line defined by the nonlinear cut. This is sometimes called a "flap" in the sense that it can independently hinge along its hinge line relative to the rest of the structure around it. That rest of the structure will sometimes be called unpatterned or interconnecting as it connects or interconnects the whole structure around the flaps defined by the nonlinear cuts, and they do not hinge outside the general plane of the structure.

Specific Example 1

The following specific example goes into detail regarding a PET/PDMS strip structure. As will be seen, it investigates and reports proof-of-concept regarding nonlinear cuts in patterned regions of the strip. Those nonlinear cuts can all be uniform and in the same direction across the width and along the length of the strip. Alternatively, they can vary in shape and/or direction either across the width of the strip and/or along the length of the strip. And they can vary as far as where they occur in each patterned region.

To assist in discussing Specific Example 1, the general strip structure will be referred to as strip 10, and comprise a lamination of an inelastic PET layer 11 and elastic adhesive PDMS layer 19. See FIG. 2A. A general X-Y-Z coordinate system (see FIG. 1A) will sometimes be used to refer to length of strip 10 relative its longitudinal axis Y, a width of strip 10 relative its transverse axis X, and a thickness between opposite sides relative to a Z axis. Additionally, alternating regions 20 along the length are termed patterned because they have at least one sub-region with a nonlinear cut (generally called cut 25) through the thickness of strip 10, which interrupts the monolithic nature of the inelastic film 11. To assist in explanation, each patterned region 20 across the width of strip 10 will sometimes be referred to as a row R, and each subregion across the width of the strip will be considered a row column C. For example, in FIG. 1A, there are fourteen patterned regions 20 between opposite longitudinal ends 14 and 15 of strip 10, and thus fourteen rows R1-R14. There are eight sub-regions per row, and thus eight columns C1-C8. The number of rows and columns can, of course vary (including from just one to many) according to design. For purposes of this example, ends 14 and 15 will sometimes be called forward end 14 and reverse end 15 to help in understanding when talking about forward and reverse peel directions of strip structure 10 from a target surface.

Figure 1A:
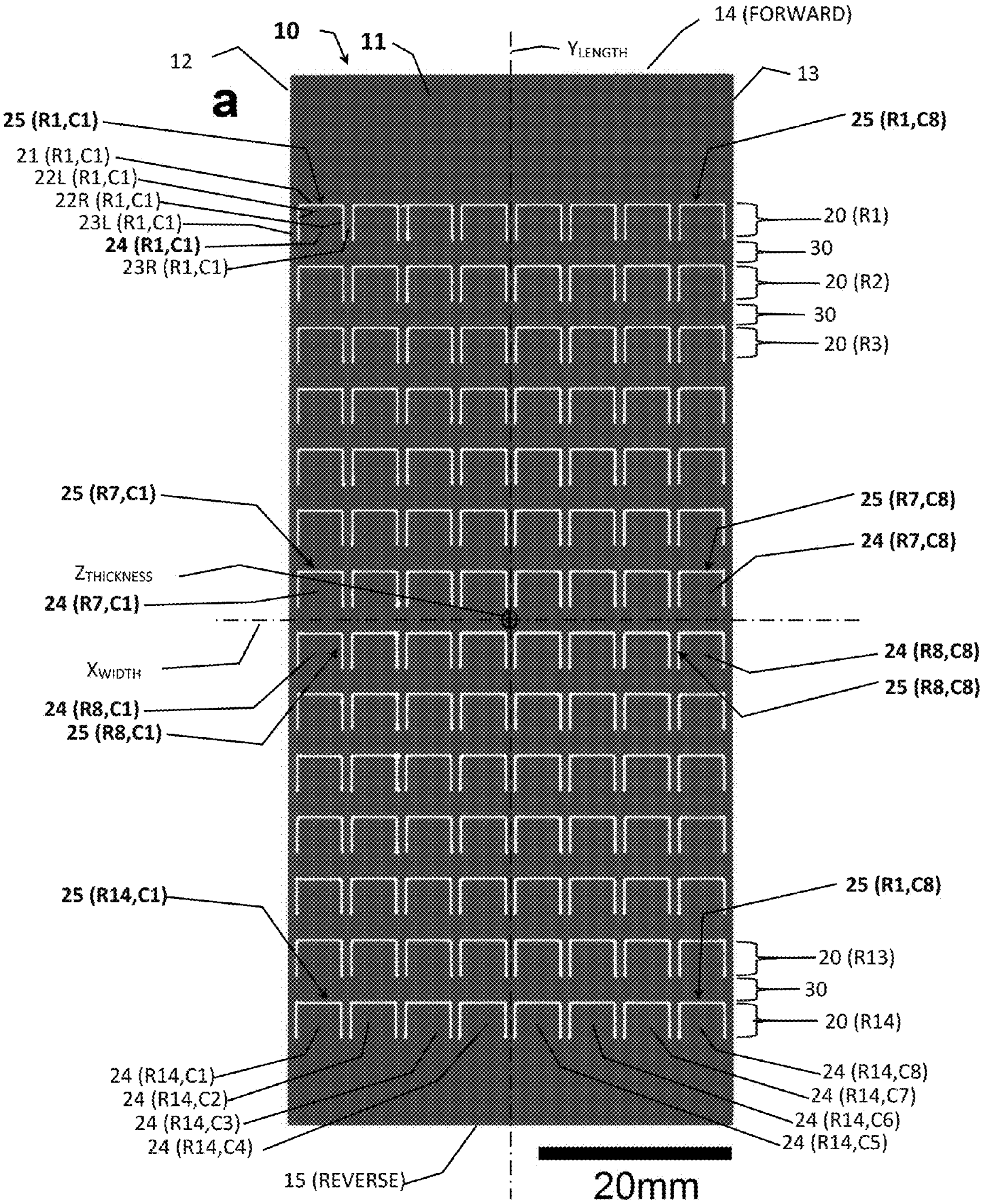
FIGS. 1A-J, 2A-F, 3A-E, and 4A-B relate to several example variations of a Specific Embodiment 1 according to the present invention.

In FIG. 1A, each sub-region of a patterned region 20 has a non-linear cut 25, and each is identical both across each region 20 and along the length of strip 10 (each row R and column C has an identical U-shaped cut 25 in terms of cut shape from opposite cut terminations, including the direction the U-shape is facing relative to strip 10). Each U-shaped cut 25 has two generally parallel linear cut sections 22L and 22R in the direction of longitudinal axis Y, and a linear intermediate cut section 21 in the transverse axis X direction. While individual cuts 22L, 22R, and 21 are linear/straight, the overall cut 25 is non-linear in the sense it is not parallel along its whole length to any axis X or Y.

As further shown in FIG. 1A, each U-shaped cut 25 defines an area in the sub-region that will be called sometimes a flap 24. This term is used to connote that there is essentially a living hinge along a line (see, e.g., dashed line 27 in FIG. 1B) between the opposite termination points of nonlinear cut 25. The rectangular flap 24 can move out of the general X-Y plane of the overall strip 10 by hinging along that living hinge line 27.

Note further that the areas around each cut 25 basically stay in-plane with the overall strip 10 at all times. These interconnects essentially frame opposite lateral sides of each flap 24 at cut sections 22L and 22R. These interconnects are labelled 23L and 23R and basically are opposite transverse borders of each column C or subregion of a patterned section 20 that includes a non-linear cut 25.

Note also that what will be called unpatterned regions 30 alternate between patterned regions 20 and extend across the width of strip 10. These regions 30 do not include non-linear cuts 25. They basically separate and frame opposite sides of each row R of patterned regions 20 relative to the long axis Y of strip 10. They basically stay in-plane of strip 10.

Note, too, that side interconnects 23 connect adjacent unpatterned sections 30. Thus, each non-linear cut 25 and its flap 24 are framed by interconnects 23 and adjacent unpatterned sections 30. As will be discussed in detail below, the configuration of FIG. 1A, if adhered to a target surface (ref. no. 100), allows flaps 24 to move out of the X-Y plane of strip 10 and provide certain adhesive characteristics.

Kirigami-inspired adhesive systems with linear cut patterns from our previous work demonstrate high adhesive capacity as well as easy release (see *ACS Applied Materials & Interfaces* 2018 10 (7), 6747-6754 and U.S. Ser. No. 16/748,442). The easy release characteristics are actualized when the adhesive is peeled in the orthogonal directions. In the current work, nonlinear patterns are introduced into the adhesive system, which results in further improved adhesive capacity and new directional easy release. See, e.g. FIG. 1A. FIGS. 1B-E shows the adhesive switching of an adhesive strip 10 with rectangular patterns 24 defined by U-shaped cuts 25 under peeling and the corresponding mechanism that can significantly tune the adhesion. We define the on-state as the condition at which higher adhesion is generated, whereas the off-state as the condition at which lower adhesion or easy release is attained. The adhesive structure 10 with rectangular patterns 24/25 displays two different adhesive capacity in opposing peel directions. The adhesive switching is dependent upon the structure 10 at the interface between structure 10 and a target surface 100. In the on-state peel direction 80F (forward), under the 90 degree peel test of FIGS. 1B and 1D, the crack front travels across each interconnect 23L and 23R at a high secondary peel angle (yellow arrows 83), is arrested at the tips or termination points of each cut 25 (at arrows 84) that defines interconnected structures (sections 30 and interconnects 23L and 23R that frame that row R non-linear cuts 25), and travels backward into the adhered rectangular regions 24 at an effective low angle (green arrows 86). See FIG. 1D. The presence of the adhered rectangular regions 24 (see, e.g., Row R8 in FIG. 1B) causes a transition from a high angle peel mode (~90°) in the interconnected structures to low angle peel mode (~10°) in the rectangular regions during a 90 degree peel test. Invariably, the adhesive capacity for a constant adhesive energy is higher at small angles of peel as well as shear in contrast with high angles of peel.[1, 2] Thus, the localized peel angle transition at the nonlinear interface 24 significantly enhances adhesion under the 90 degree peel test in direction 80F. Meanwhile, in the off-state peel direction 80R (reverse peel) of FIGS. 1C and 1E, the crack front propagates along the interconnects 23L and 23R as well as rectangular regions 24 (see FIG. 1E, yellow arrows 83 and 84) and continues to propagate forward without undergoing a shift in peel angles (see FIG. 1D, yellow arrow 85). See FIG. 1E.

Figure 1B:
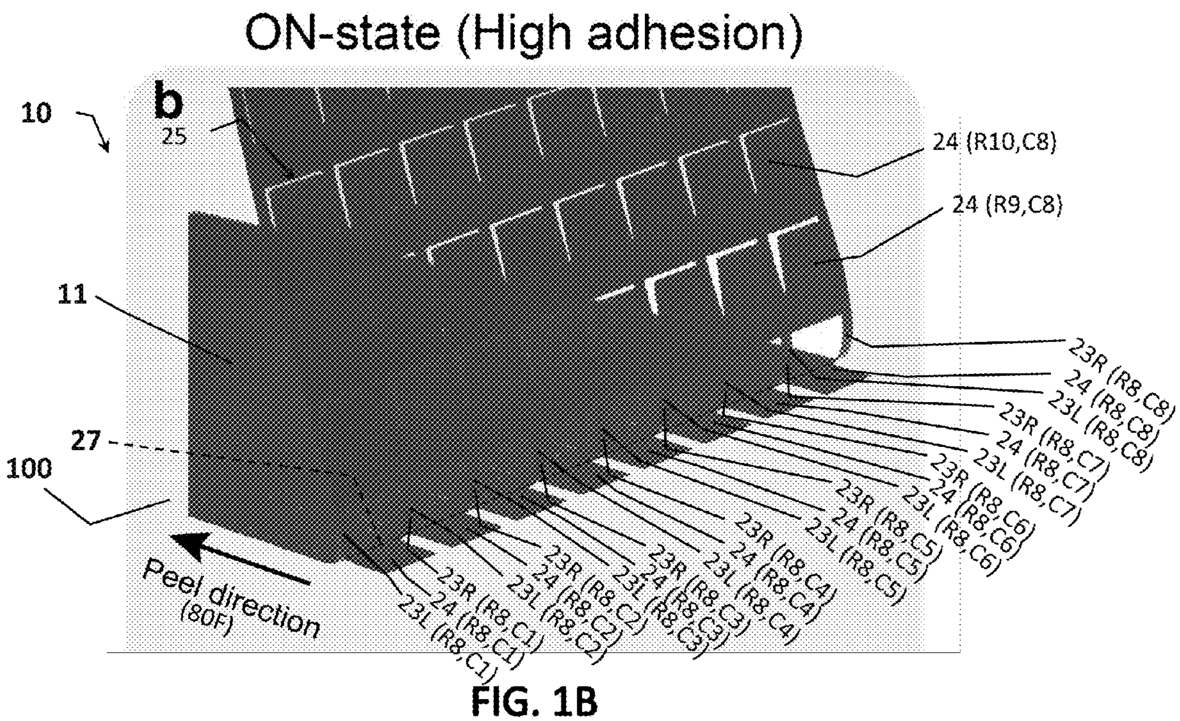
Figure 1D:
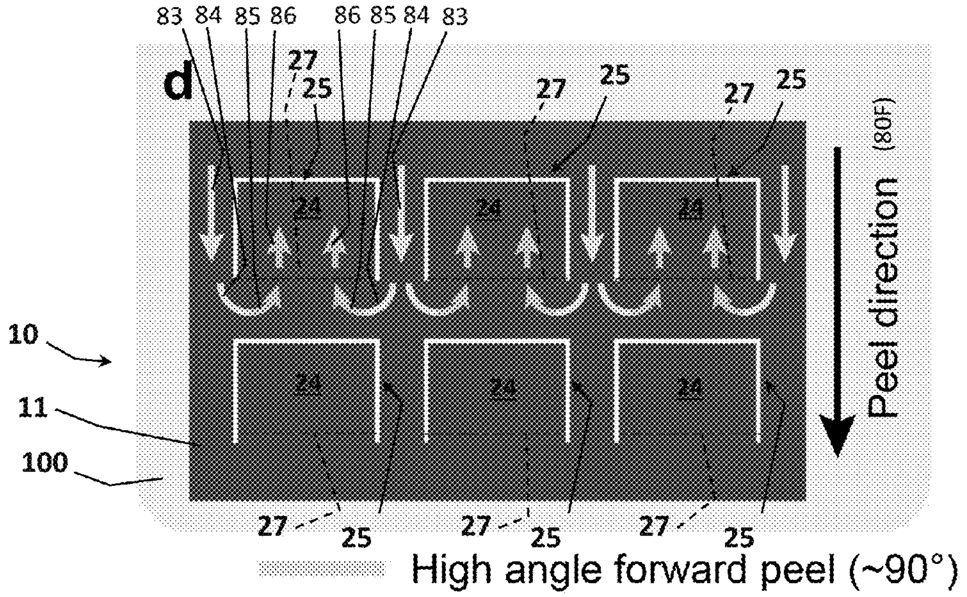
Figure 1C:
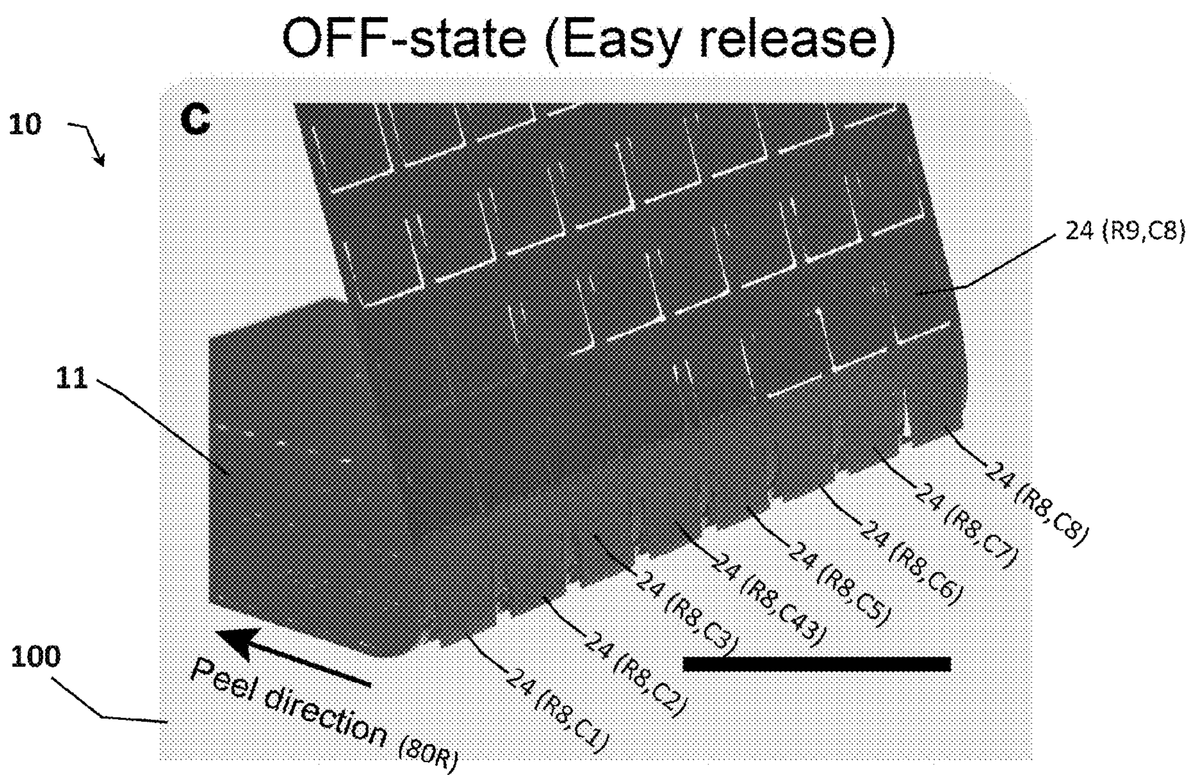
Figure 1E:
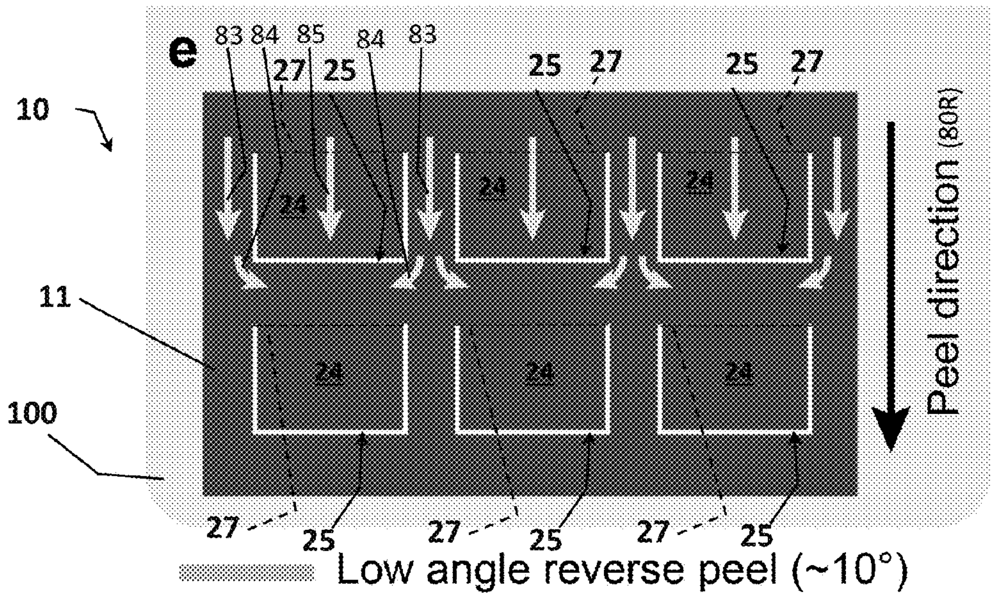
Figure 1F:
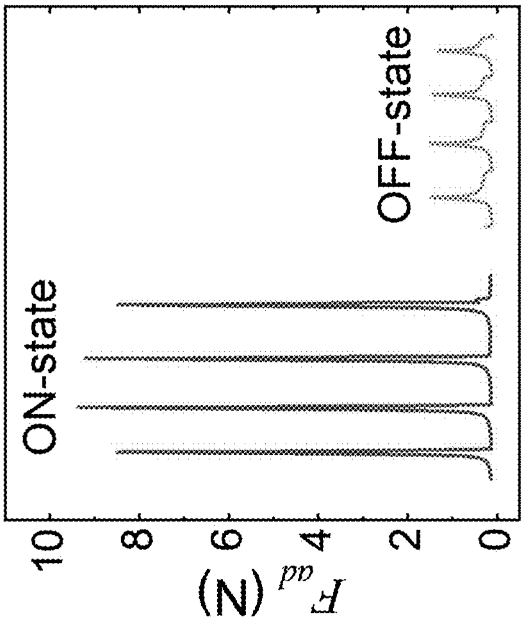
Figure 1G:
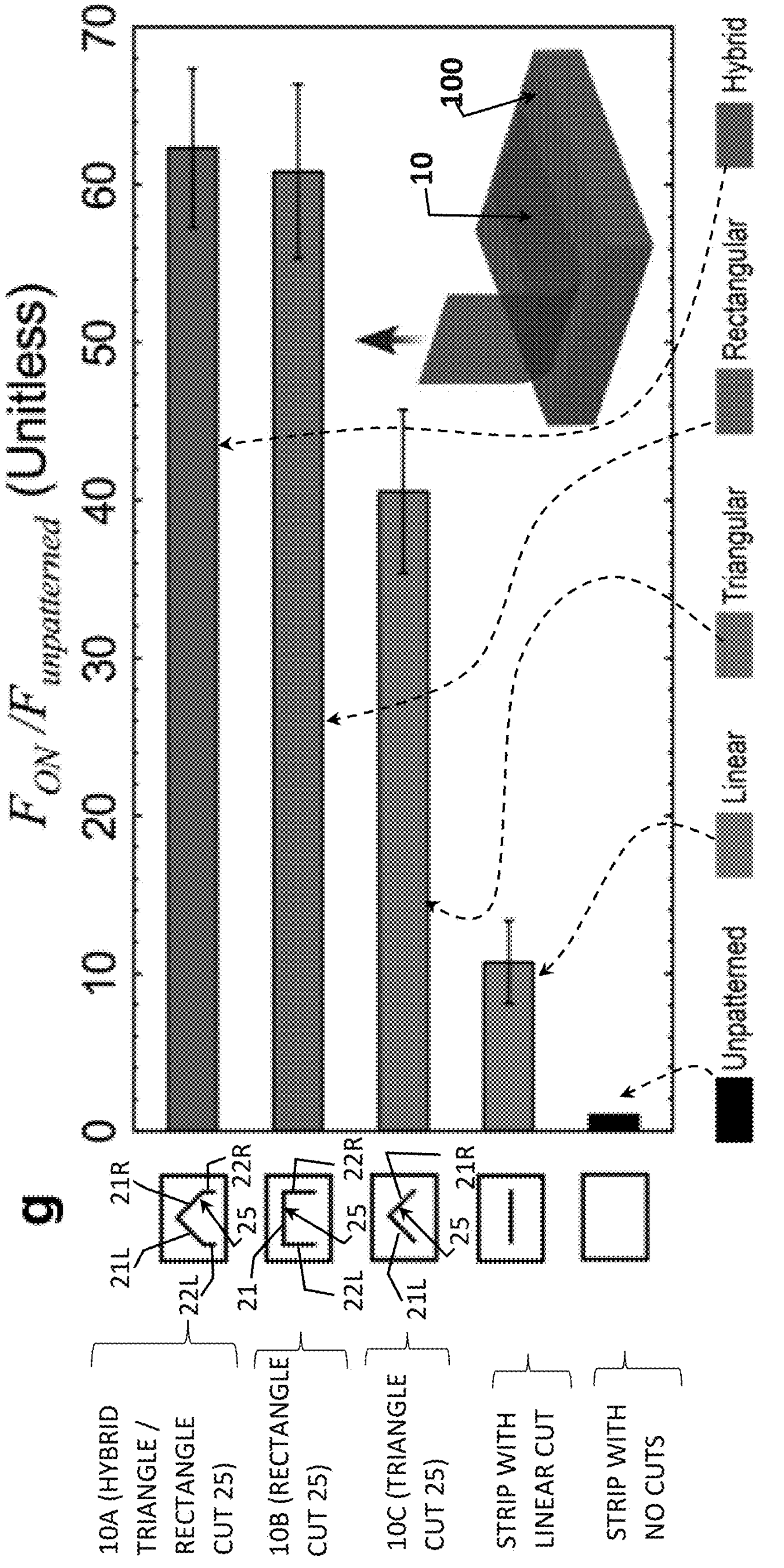
Figure 1H:
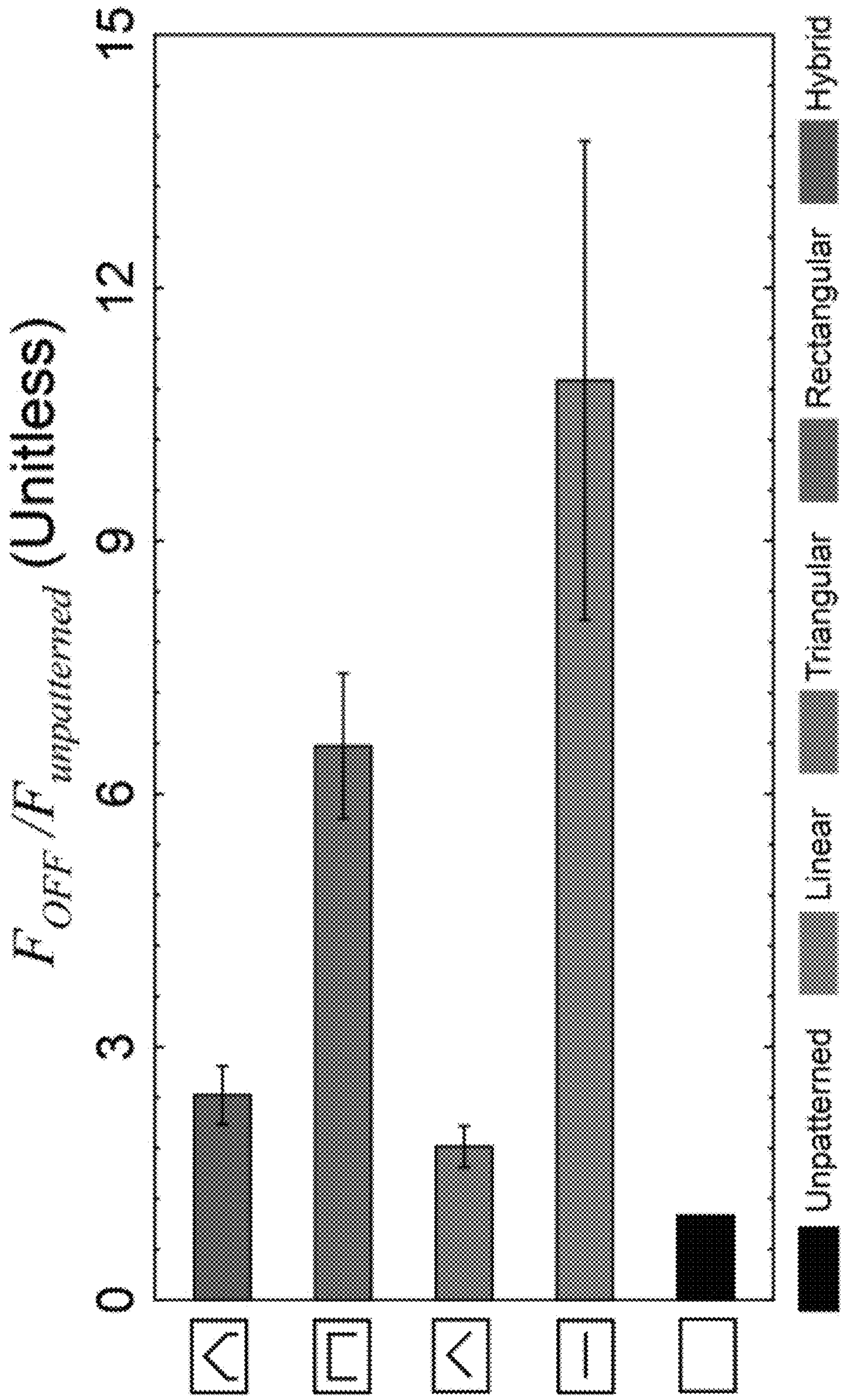
Figure 1I:
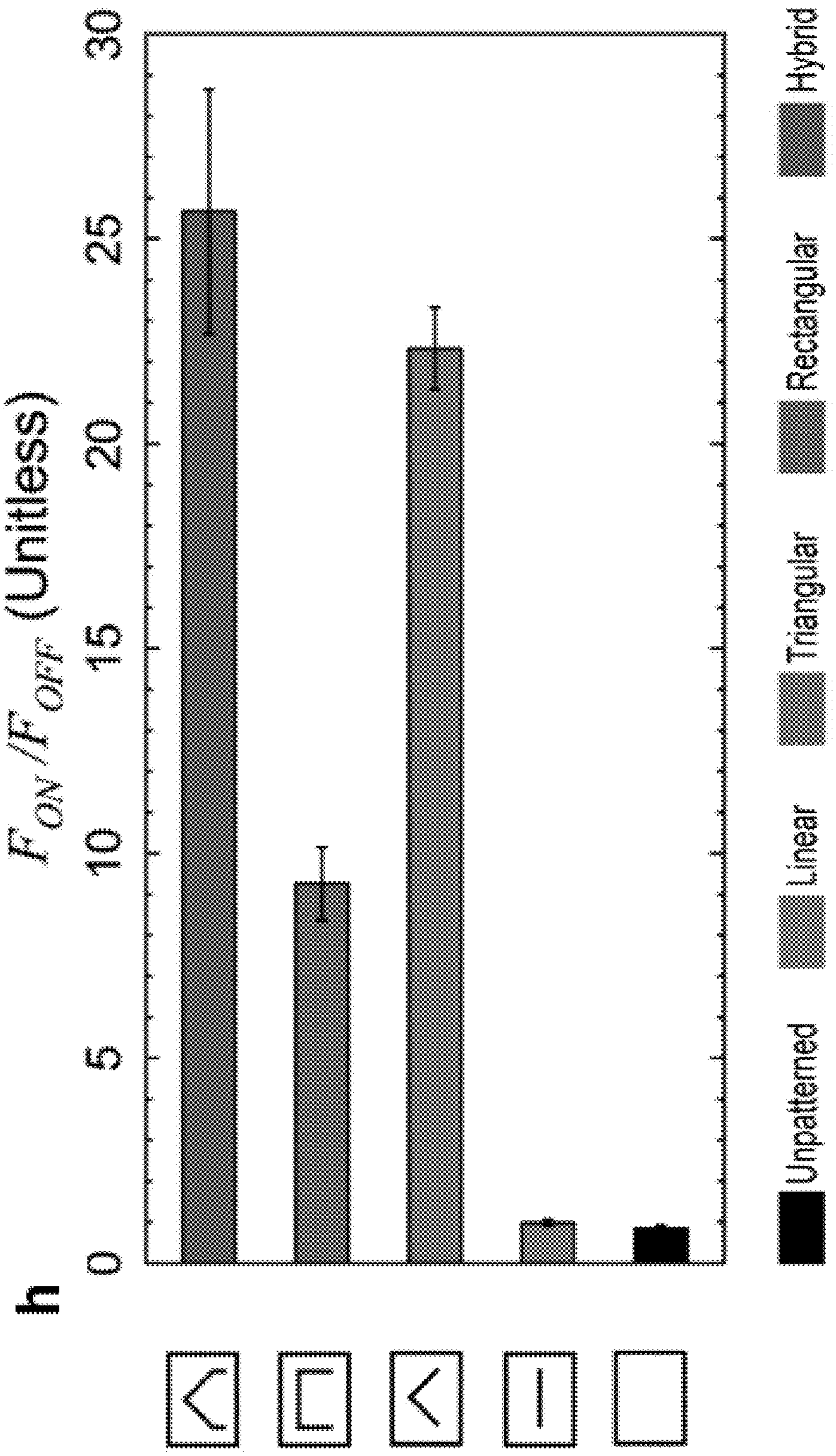

FIG. 1F shows representative peel force-displacement curves for an adhesive with rectangular cut patterns 24 in two different peel directions such as discussed with respect to FIGS. 1A-E. The choice of the peel direction significantly affects the adhesive capacity, resulting in high adhesion that enables strong attachment and low adhesion enables on-demand easy-release. The average peak force achieved in the on-state peel is larger than that in the off-state by a factor of ~10. FIG. 1G shows representative adhesion enhancement ratio $F_{ON}/F_{unpatterned}$ of various cut patterns: unpatterned (labelled "strip with no cuts"), linear (labelled "strip with linear cut"), triangular (labeled strip 10C with triangle cut 25 with cut segments 21L/21R), rectangular (labelled strip 10B with rectangular cut 25 with cut segments 22L/22R/21), and hybrid or triangle/rectangle cut 25 (labelled strip 10A with parallel cut segments 22L/R and converging cut segments 21L/R). The enhancement ratio of the linear patterns (straight cuts) over the pristine (no cuts) is ~10. The enhancement originates from the change of the bent adhesive strip while the crack propagates from the compliant to the stiff, which induces the variation of the stored elastic energy. The enhancement ratio is significantly increased by introducing the nonlinear geometry into the adhesive strip. The triangular patterns 21L/21R enhance the on-state adhesion by a factor of ~40, and the rectangular patterns 22L/22R/21 enhance adhesion by a factor of ~60. The hybrid patterns 22L/22R/21L/21R can result in at least approximately the same as the rectangular pattern cuts. The significant enhancement, with respect to that of linear (straight cut)

patterns, stems from the variation of the fracture modes, caused by the localized transition of the peel angle in the flaps. Peeling in the other direction provides the release force $F_{OFF}$. FIG. 1H shows the $F_{OFF}/F_{unpatterned}$ of various cut patterns for the different adhesive designs. Directional switching ratios (SR) $F_{ON}/F_{OFF}$ of the five different adhesives are presented in FIG. 1H. The switching ratio is one for the unpatterned (no cuts) adhesive and linear patterns (straight cuts), as the crack propagation behavior in opposing peel directions is identical. In contrast, the SR significantly increases with nonlinear patterns, such as triangles (strip 10C) and rectangles (strip 10B), and hybrid (strip 10A). This is a result of the discrepancy in crack propagation behaviors. As a preliminary demonstration, we attached a sample with rectangular cuts (strip 10A) onto an acrylic substrate (target surface 100) in two different peel directions and hung a 250 g weight on the peel arm (an unadhered end of strip 10). See FIG. 1I. The adhesive positioned in the on-state peel direction remains attached under the weight, whereas the adhesive in the off-state peel direction rapidly releases across the entire strip.

As will be appreciated by those skilled in the art in reviewing and comparing FIGS. 1G, 1H, and 1H, performance of the different shapes can be considered for the "ON" peel direction or the ON-to-OFF ratio as far as need or desire for a given application. Additionally, both "ON" and "ON-to-OFF" can be considered. For example, the hybrid pattern shows highest adhesion enhancement over the other patterns when both "ON" and "ON-OFF" are considered, even though "ON" is on the same order of improvement as the rectangular pattern. Rectangular has lesser enhancement than hybrid considering both criteria, but there may be other reasons to select rectangular over hybrid (e.g. manufacturing considerations/cost/complexity, precision, or other). Similarly, although the triangular pattern may have less enhancement over linear cuts or no-cuts than both rectangular and hybrid patterns, like them it offers enhancement over linear cuts or no-cuts and there may be reasons to select to use triangular over rectangular and hybrid.

Furthermore, as discussed throughout, the hybrid, rectangular, and triangular non-linear patterns are non-limiting and just a few examples of non-linear cuts. They could be regular shapes or irregular shapes. They could be polygonal or non-polygonal. They can involve several sections of different lengths and shapes. For example, the hybrid pattern has parallel, equal length, spaced apart sections from opposite termination points of the overall non-linear cut at the hinge line. It then has converging sections from the parallel sections to the forward point of the triangular leading part of the flap. Any of those sections could be curved or made up of more sections of different lengths, directions, and shapes, etc. The hybrid flaps do not necessarily have to be regular or symmetrical. There may be reasons to use the symmetrical hybrid shapes like the figures, but such is not necessarily required. Similarly, rectangular or triangular regular or symmetrical cuts as in the figures are not necessarily required, but there may be reasons to use them. Again, the cuts can be any non-linear shape that produces some type of flap.

Adhesion as a Function of Cut Geometry

Figure 2A:
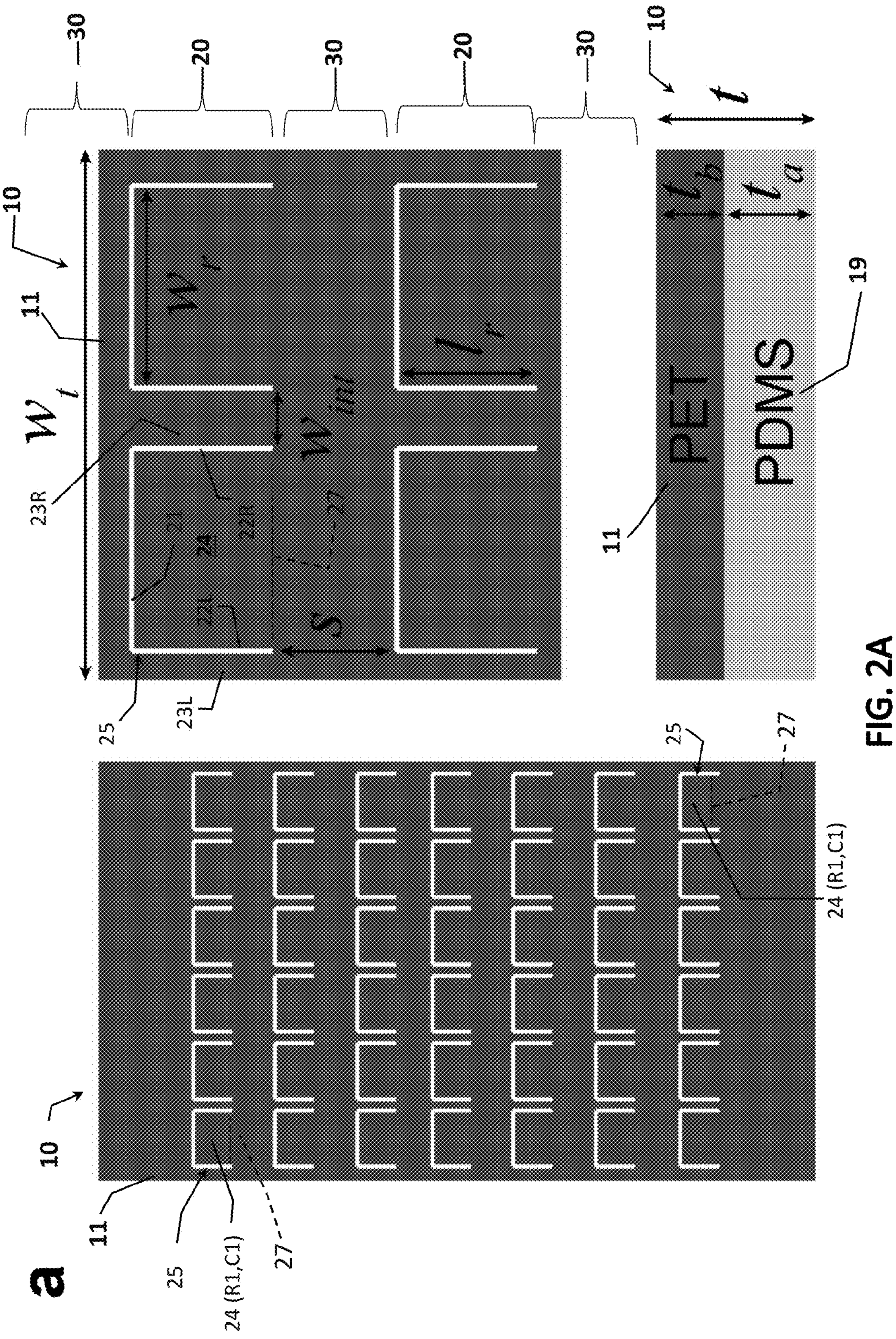
Figure 2B:
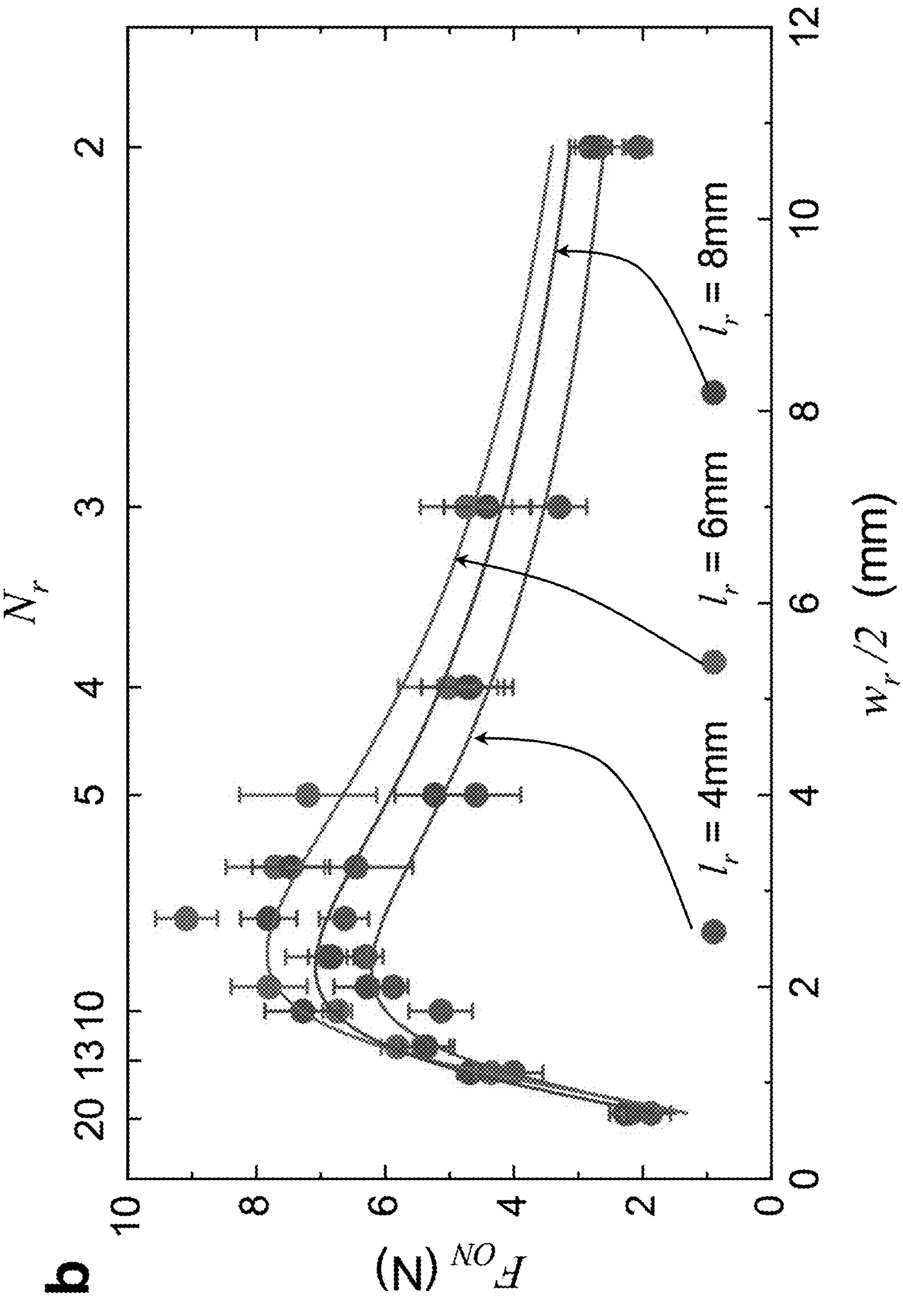
Figure 2C:
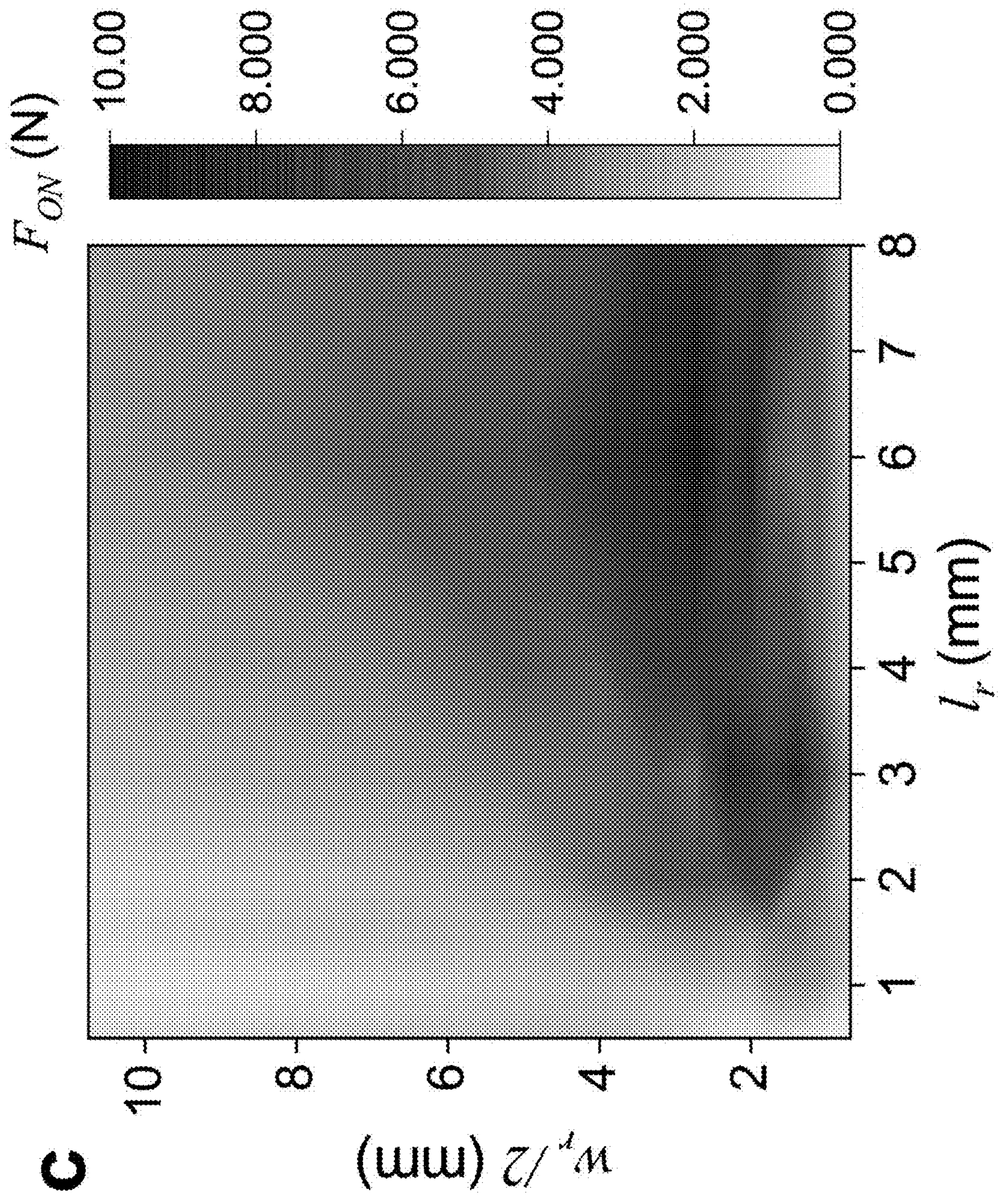
Figure 2D:
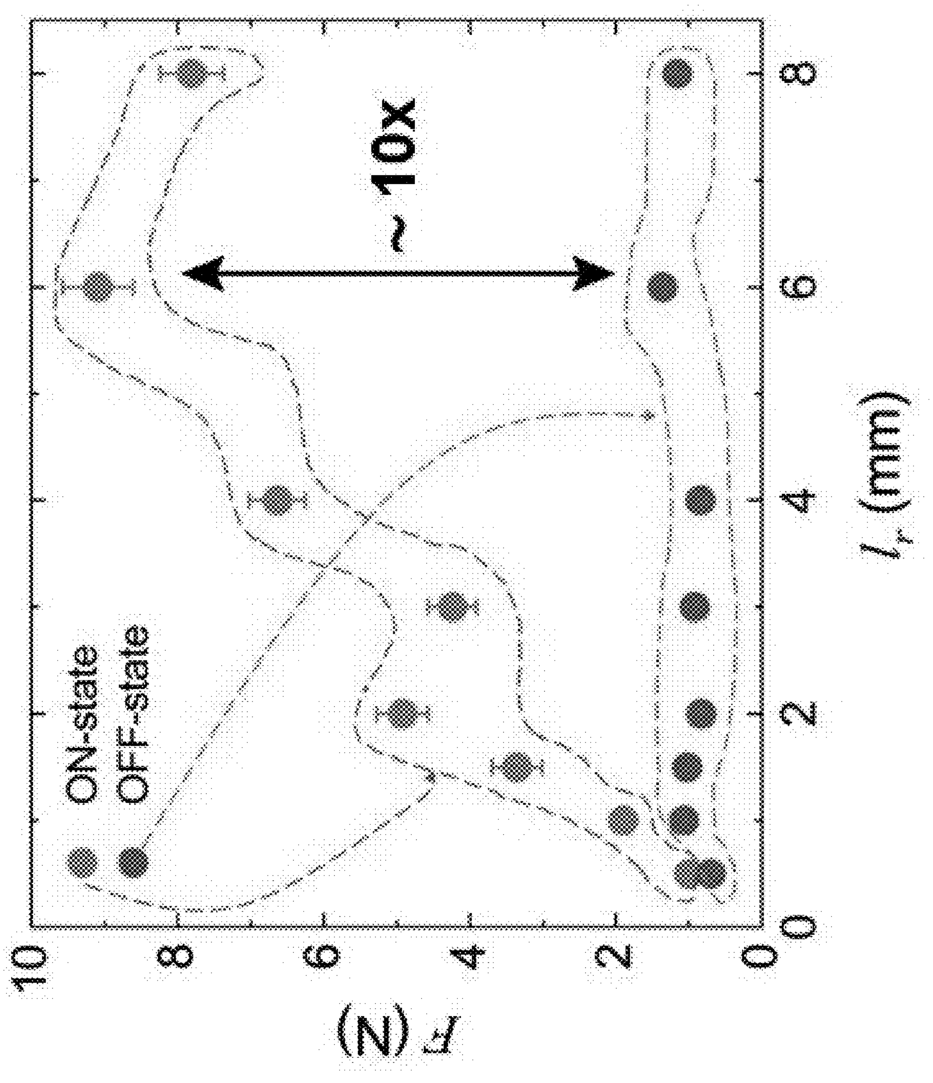

We define geometric parameters of the adhesive system 10 with rectangular cut patterns to systematically investigate the effects of geometry on the adhesive capacity of an adhesive strip with a total width $w_t$ (FIG. 2A). Each rectangular pattern 24 by U-shaped cut 25 is characterized by width $w_r$ and length $l_r$. The longitudinal spacing s between rectangular patterns varies (s=1, 2, 3, 4, 5, and 6 mm), and the transverse interconnect spacing $w_{int}$ between rectangular patterns is constant throughout the experiment ($w_{int}$=1 mm) The thickness t of the adhesive strip 10 consists of a PET backing layer sheet (ref. no. 11) $t_b$ and an adhesive PDMS layer (ref. no. 19) $t_a$. FIG. 2B illustrates the on-state peak force of adhesives with three different widths of the rectangular pattern $l_r$ (=4, 6, 8 mm) as a function of the half width of the rectangular pattern $w_r/2$. The total width $w_t$ of all measured adhesives is constant (=46 mm), thus the number of rectangular patterns per row $N_r$ is determined accordingly ($w_t=w_rN_r+w_{int}(N_r-1)$). In general, adhesives with shorter $w_r/2$ than ≈3 mm show reduced on-state peak force because the peel front propagates the rectangular patterns with partial crack arrest. The reduction in the peak value is also observed for designs with both $l_r$ and s less than ≈3 mm for the same reason. The experimentally measured length scale (≈3 mm) is the characteristic length, where the characteristic length $$\left(l_{ch} = \sqrt{\frac{2E_cI_c}{wG_c}} \approx 3\ \text{mm}\right)$$

is a length scale similar to the dimension of the stress field. Adhesives with longer $w_r/2$ than ≈3 mm show reduced on-state peak force as well. As the peel front is effectively arrested at the tip of each interconnect, designed with a greater number of interconnects increase adhesion. Therefore, the reduced number of crack initiation points results in the reduction in the on-state peak force. In contrast, optimized on-state peak force is obtained when $w_r/2$ is slightly longer or similar to ≈3 mm. FIG. 2C presents a collection of on-state peak values for a range of both $w_r/2$ and $l_r$. When either or both of the geometric parameters are smaller than the characteristic length, optimized adhesion will not be achieved due to partial crack arrest. Granted that selected geometric parameters are larger than the characteristic length, if the number of crack initiation points is limited, obtaining optimized values from an adhesive of a constant $w_t$ is challenging. Therefore, when designing an adhesive with optimized adhesion, the selection of proper geometric dimensions to account for both effective crack arrest and maximized number of crack initiation points is important. Among all geometric parameters that determine adhesion, directional adhesion switching is essentially created and governed by the extent of the $l_r$ (FIG. 2D). The adhesion switching $F_{ON}/F_{OFF}$ in opposing peel directions does not exist in the absence of the $l_r$ (=0 mm), which is identical to an adhesives with linear cut patterns (SR=1). However, as $l_r$ increases in the rectangular patterns of an adhesive, the on-state peak force diverges from the off-state peak force (SR>1) until $l_r$ is greater than the characteristic length $l_{ch}$, where $F_{ON}$ reaches a plateau value. As an example for one geometry, when the adhesive design meets the criterion $l_r>l_{ch}$, the on-state peak force of the adhesive is ~10× higher than the off-state peak force.

Figure 2E:
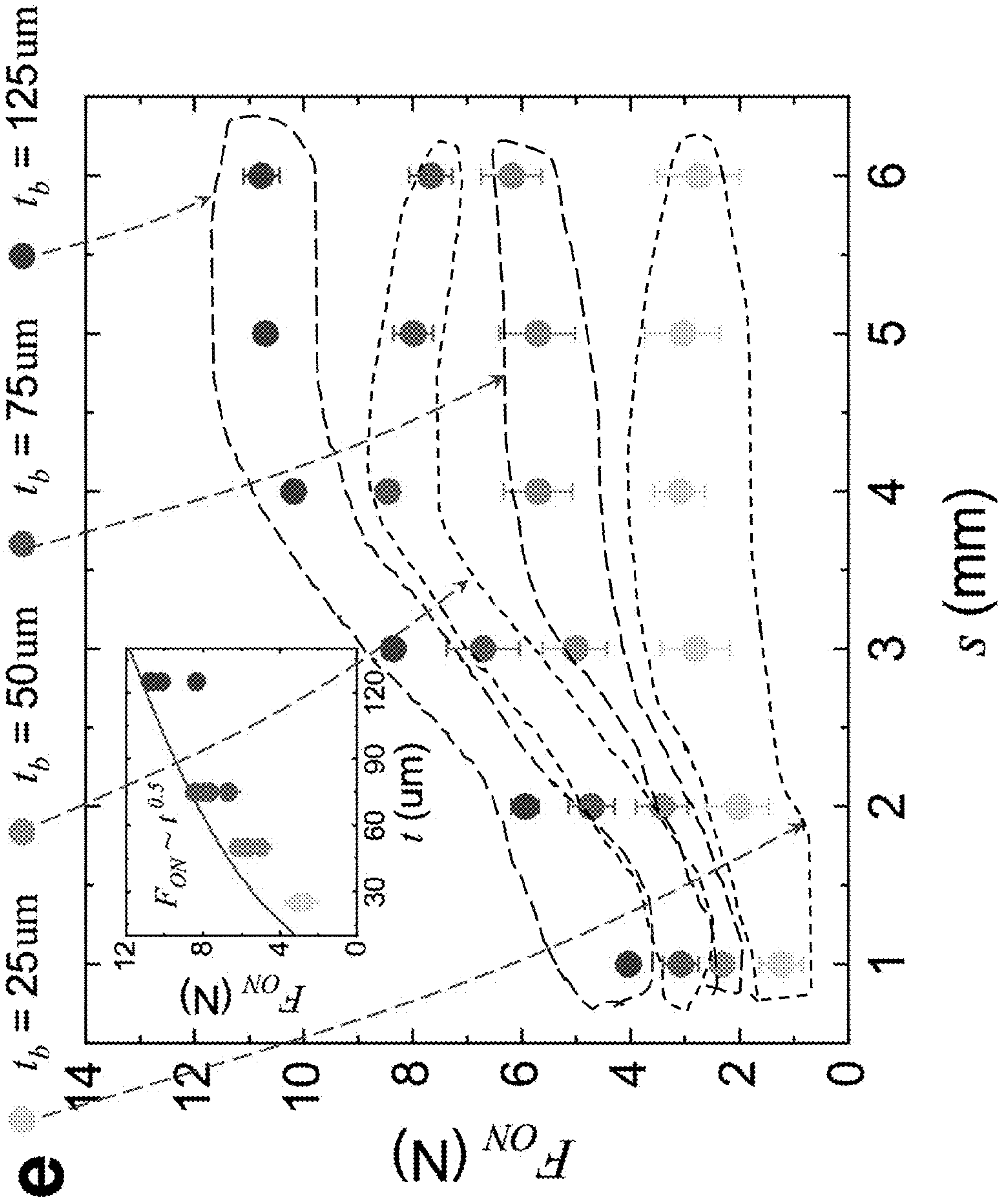

The nonlinear patterns of the kirigami-inspired adhesive induce a localized transition of peel angles from high to low under the 90 degree peel test. The latter crack propagation mode is similar to shear loading in which the load is dependent upon elastic modulus and thickness (t). Thus, we change the thickness of the PET backing layer $t_b$ while the thickness of the PDMS adhesive layer $t_a$ is kept constant because the PET modulus is significantly larger compared to PDMS ($E_{PET}$≈3000$E_{PDMS}$). FIG. 2E illustrates the on-state peak force of adhesives with different $t_b$ (=25, 50, 75, and 125 um) as a function of the spacing s. We see that increasing the thickness of the backing layer of the adhesive results in increased on-state peak adhesive force. This can be explained in terms of a scaling law of the shear loading $F \sim t^{0.5}$ (inset), indicating that the shear loading plays an important role in the adhesion enhancement mechanism. To further understand the crack propagation behavior, we plot the relative displacement of the crack front versus time in FIG. 2F. Initially, an accelerated crack from the release of accumulated bending energy of the preceding region progressively decelerates while traveling the stiff region (zone i in FIG. 2F). When the crack propagates into the interconnected structures, this entering results in the acceleration due to the bending energy release of the crack propagation, followed by the deceleration (zone ii in FIG. 2F). Finally, when the crack reaches the tip of each cut that defines interconnected structures, the crack gets trapped at the stiff interface (zone iii in FIG. 2F). Further external loading causes rapid interfacial failure, where the crack is accelerated. (zone iv in FIG. 2F).

Programming Adhesion Spatially

Patterning Adhesives with Cut Structures Allows for Spatial Tuning of Adhesive Behavior.

Figure 3A:
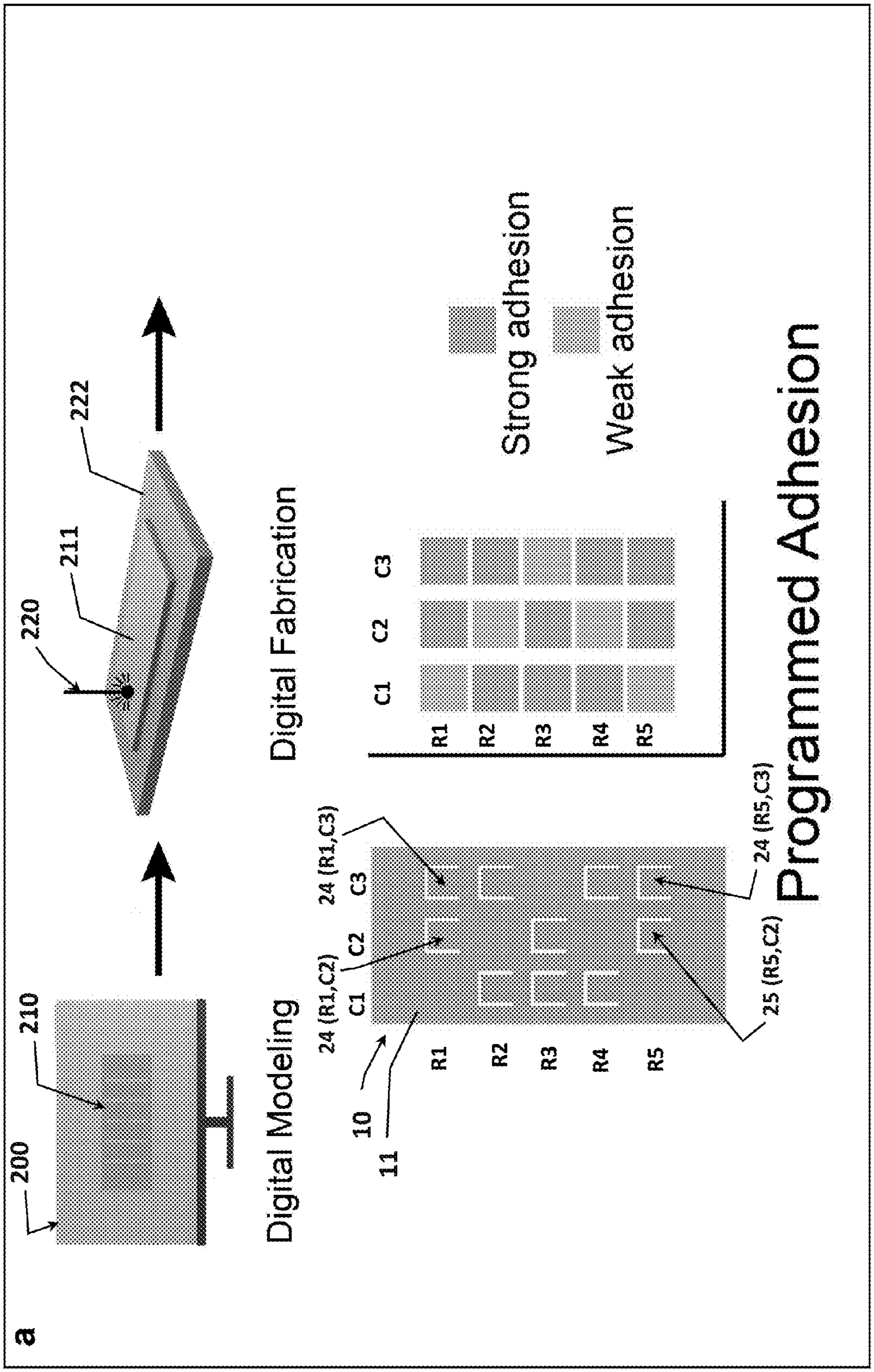
Figure 3B:
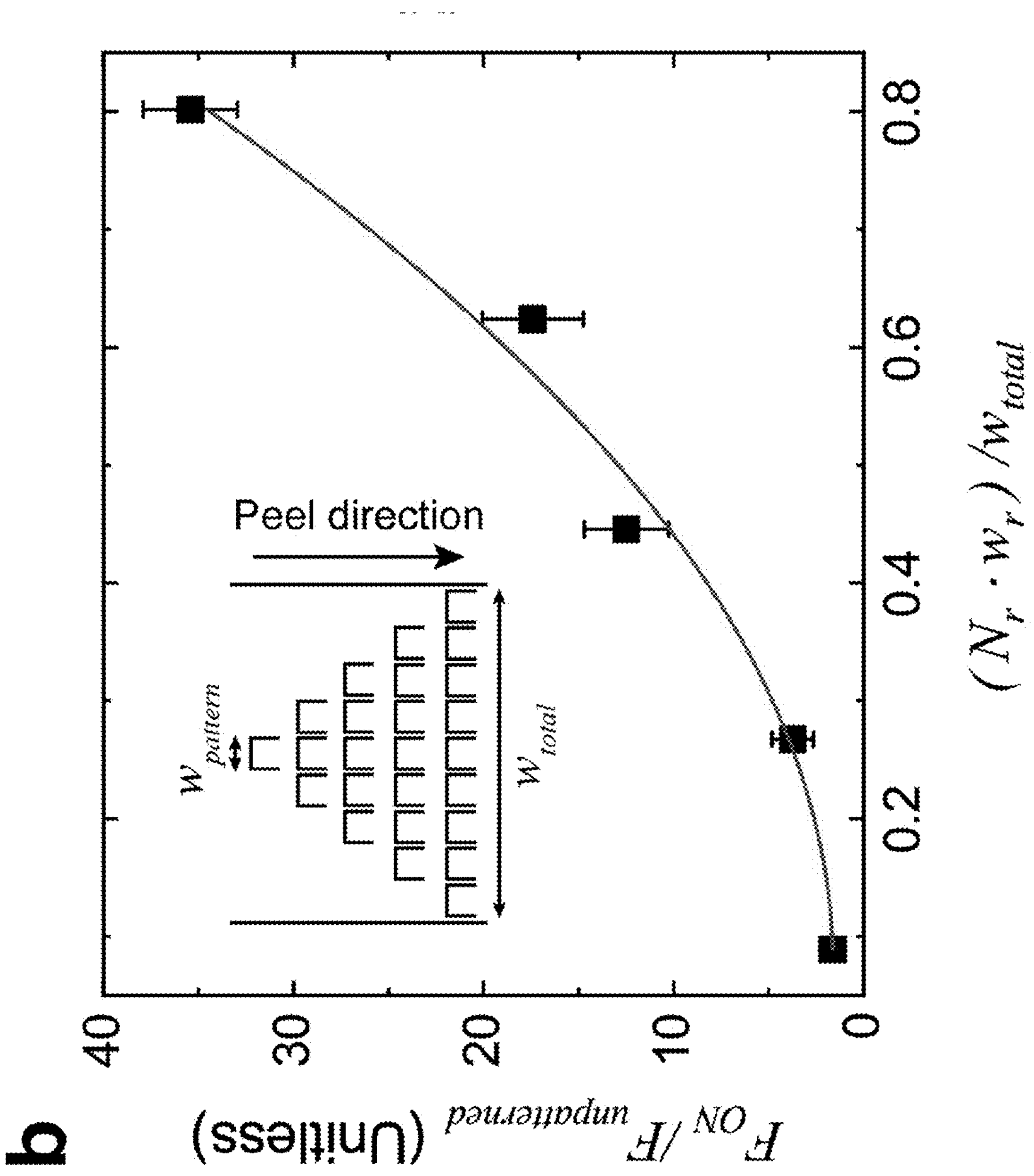
Figure 3C:
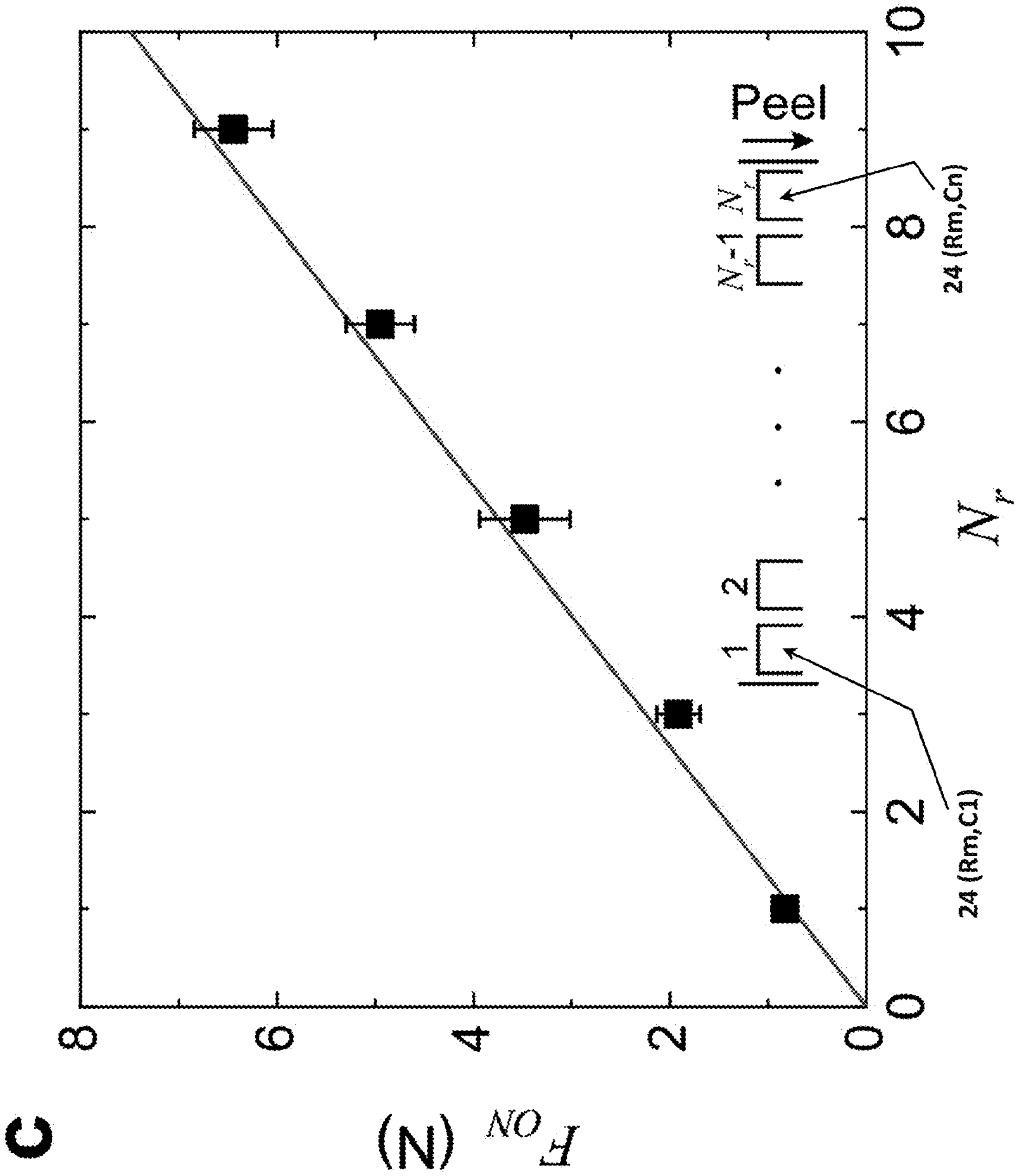
Figure 3D:
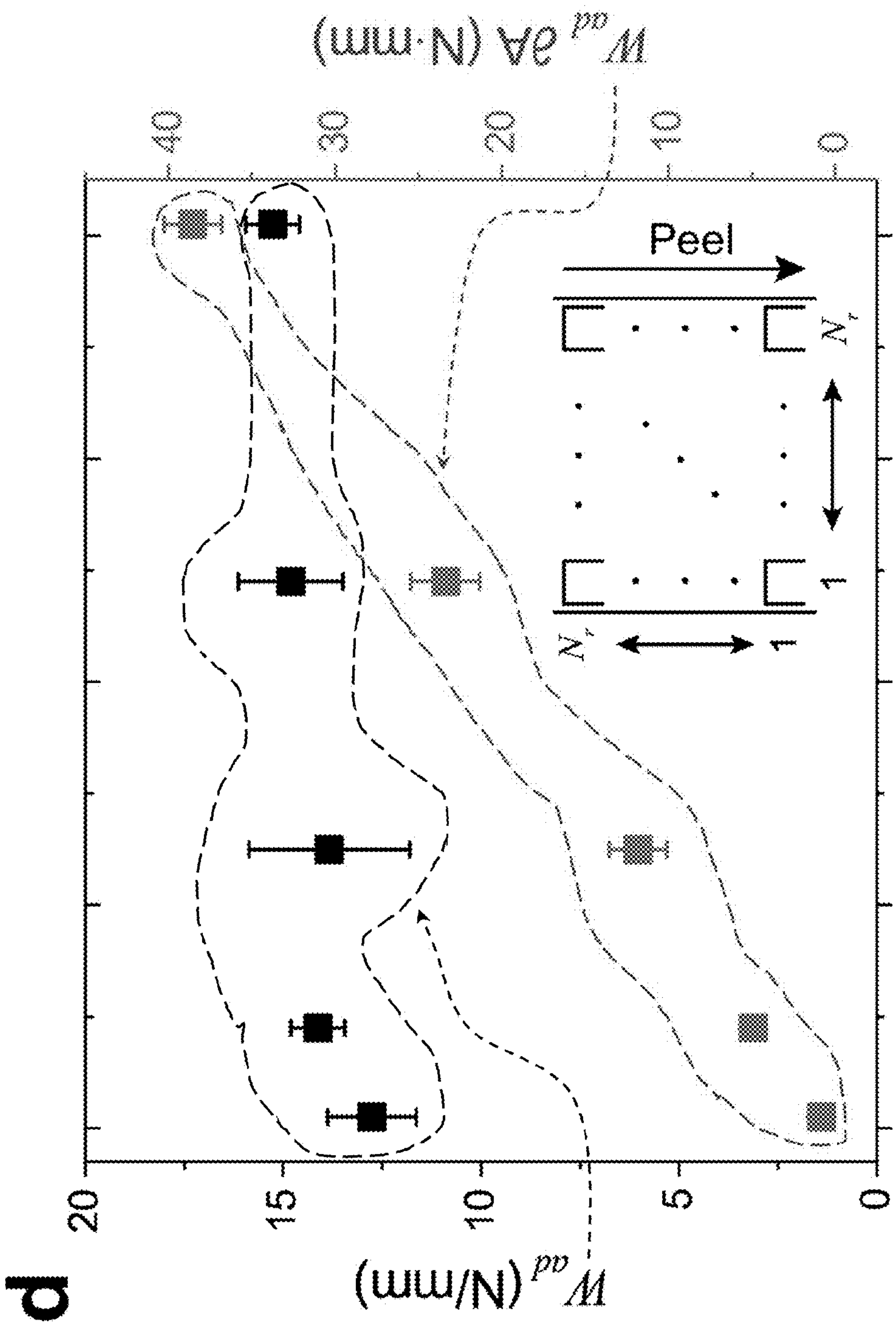

An advantage of kirigami-inspired adhesives is that the cut structures can be rapidly designed and created in a digital fabrication framework. Here, the placement of patterns across an adhesive sheet can be used to program adhesion spatially (FIG. 3A). In the case of an adhesive strip of constant total width $w_{total}$ (=50.5 mm) with a varying number ($N_r$=1, 3, 5, 7, and 9) of rectangular patterns ($w_r$=4.5 mm) per row, adhesion enhancement increases with increasing $N_r$ per row (FIG. 3B). This indicates that the effect of patterning is still effective, even with a combination of patterned and the unpatterned features in a row. This result opens opportunities to readily pattern adhesion strength across diverse regions of interest. To demonstrate the scalability of the cut-based adhesion enhancement concept, we fabricate patterned adhesive strips of varying $w_{total}$ (=6.5 mm to 50.5 mm) with varying $N_r$ in order to exclude the effect of unpatterned regions in the row (FIGS. 3C and D). We find that there is a linear relationship between the adhesive on-state peak value and $N_r$, indicating that the load of the patterned adhesive scales linearly with $w_{total}$ in the same manner as the unpatterned (FIG. 3C). The scalability is further investigated by changing the area of the patterned region $$N_r^2$$

from 1 to 81 (FIG. 3D). Here we calculate the work of adhesion $W_{ad}$ of patterned adhesives, which is defined as the work done by an external loading system to separate the interface between the adhesive and the substrate across unit area. The value is obtained by computing the area under the curve of a force-displacement plot such that $$\frac{1}{\omega_s(\delta_p - \delta_0)} \int_{\delta_0}^{\delta_P} F(\delta) d\delta$$

where $\delta_0$ is the displacement at which the crack begins transversing a stiff interface and $\delta_p$ is displacement at the peak force. The work of adhesion $W_{ad}$ is independent of the area of the patterned region, analogous to that of the unpatterned adhesive. The independence of $W_{ad}$ on the area indicates that the patterning technique with various structural geometry for enhancing adhesion is analogous to a chemistry-based technique for the same purpose. The work of adhesion multiplied by the patterned area $w_{ad}\partial A$ increases linearly with the area of the patterned region, showing that the scalability is effective with the adjustment of the area. Because the kirigami-inspired adhesives are intrinsically spatially programmable and tunable, they can be utilized as pinpoint adhesion enhancement tools for readily controlling adhesion in regions of interest. To prove the concept, we encode the layout of rectangular cut patterns in the form of a sequence of letters, "HELLO". The result was that in attempting to peel any letter "H", "E", "L", "L", or "O" in the forward direction relative the non-linear cuts (i.e. from top of the page of FIG. 3E towards bottom of the page), there was more resistance than in the reverse direction (i.e. bottom of page toward top). In certain situations, optionally we could cut away the unpatterned regions as well.

Programming Adhesion Directionality

Figure 4A:
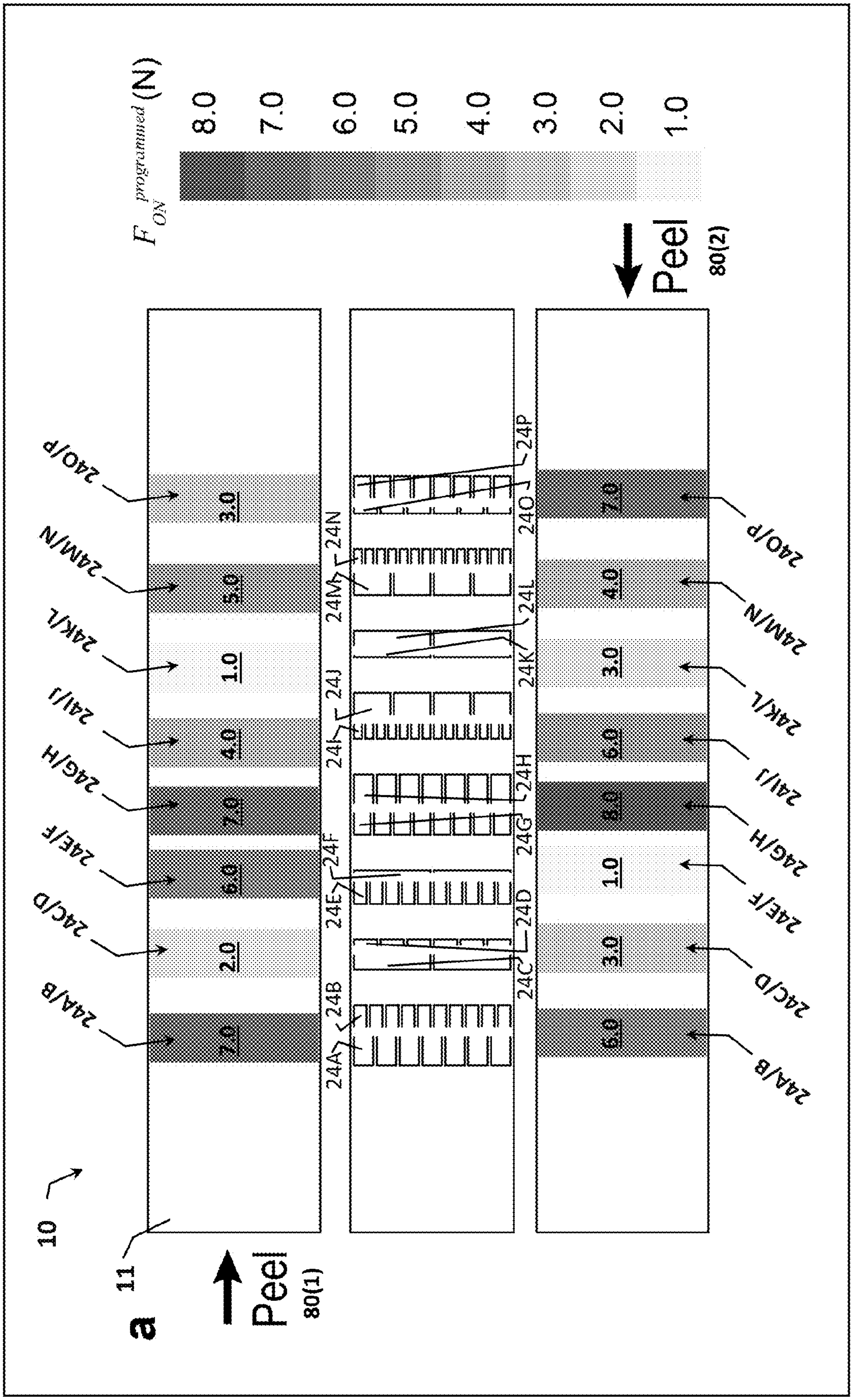
Figure 4B:
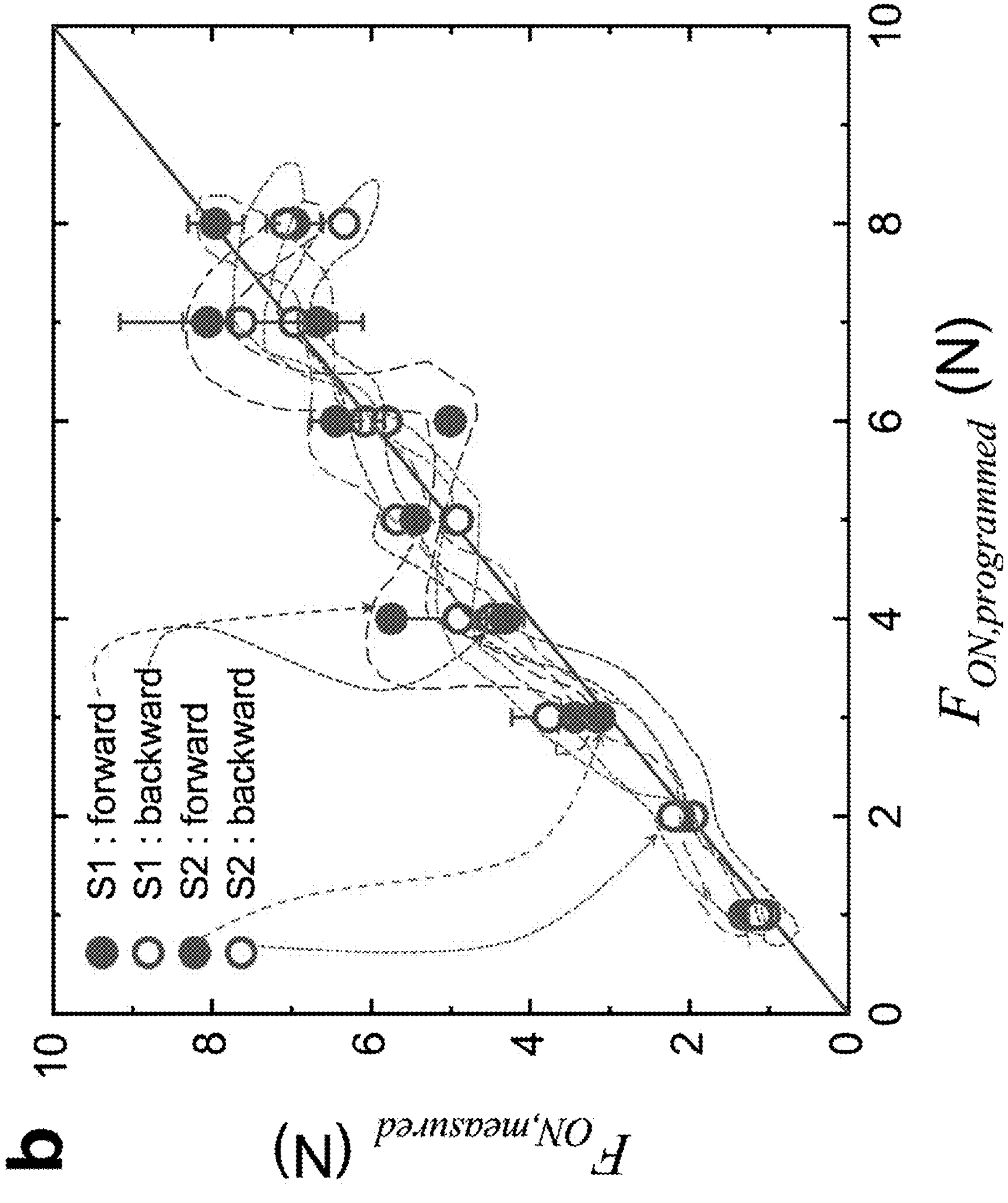

We spatially program adhesion into discrete regions, and decouple the directionality by introducing another set of rectangular patterns into each region (FIG. 4A). The uncut side of the rectangular pattern of each set faces towards each other to independently tune the on-state peak force in both peel directions. In FIG. 4B we plot the measured adhesion as a function of the programmed adhesion, showing an excellent agreement between the experimental data and programmed data.

Conclusion

As can be seen by the foregoing, this example shows ability to tune adhesive characteristics of an adhesive structure 10 by designing and making non-linear cuts through structure 10. The non-linear cuts can vary in form factor, number, and position relative to structure 10.

Experimental

Adhesive Fabrication

Single-sided kirigami adhesives are composed of a PET backing layer 11 and a PDMS adhesive layer 19. A thin PDMS elastomeric layer (Sylgard 184 with a 20:1 base resin-to-hardener ratio; Dow Corning, E=880±40 kPa, $t_{PDMS}$≈120 μm) is created on a glass plate by using a thin film applicator (ZUA 2000; Zehntner Testing Instruments) and curing at 80° C. for 60 min. PET films (Grainger, E=2.6±0.1 GPa, $t_{PET}$=75 μm) are treated with oxygen plasma (pressure: 0.7 mmHg, 1 nmin), and another batch of PDMS with the same mixing ratio is casted onto the cured PDMS layer by using the thin film applicator ($t_{PDMS}$≈30 μm). The surface treated PET films are deposited on the uncured PDMS layer, and the adhesive composite is cured in the oven at 80° C. for 60 min. The adhesive composite is then patterned using a laser machine (Epilog Laser Fusion M2, 75 watt).

Characterization

A 90° peel test setup is utilized to measure the strength of adhesion between an adhesive strip and an acrylic substrate on an Instron 5944 mechanical tester at a constant displacement rate of 1 mm/s. Prior to each run, the adhesive surface of each specimen is cleaned with isopropyl alcohol to remove residues. The adhesive strip is placed on an acrylic substrate and pressed with a rubber roller with a dwell time of 3 min before executing a test. The critical energy release rate $G_c$ of an adhesive strip is calculated by averaging the steady-state adhesion data points in the unpatterned region until a crack meets the first cut pattern and dividing the average value over the width of the adhesive strip.

Fabrication of Biomonitoring Patch

As will be appreciated, adhesive structure 10 could be programmed for any of a variety of adhesive strip or tape functions. Non-limiting examples include bandages, patches, and the like. But other functionalities can be added or built into structure 10. Non-limiting examples would be a surface that can be written upon by pen or pencil, an electrical circuit, a sensor, graphics, bandages, wearable sensors, as well as all of the examples from *ACS Applied Materials & Interfaces* 2018 10 (7), 6747-6754 and U.S. Ser. No. 16/748,442.

References

A. J. Kinloch, *Adhesion and adhesives: science and technology*. Springer Science & Business Media, 2012.

K. Kendall, "Thin-film peeling—the elastic term," *Journal of Physics D: Applied Physics*, vol. 8, pp. 1449-1452, 1975, incorporated by reference herein, and gives background information on principles related to thin-film elastic materials, peeling and adhesive properties, and other related topics.

Index to Selected Figures

Figure 1J:
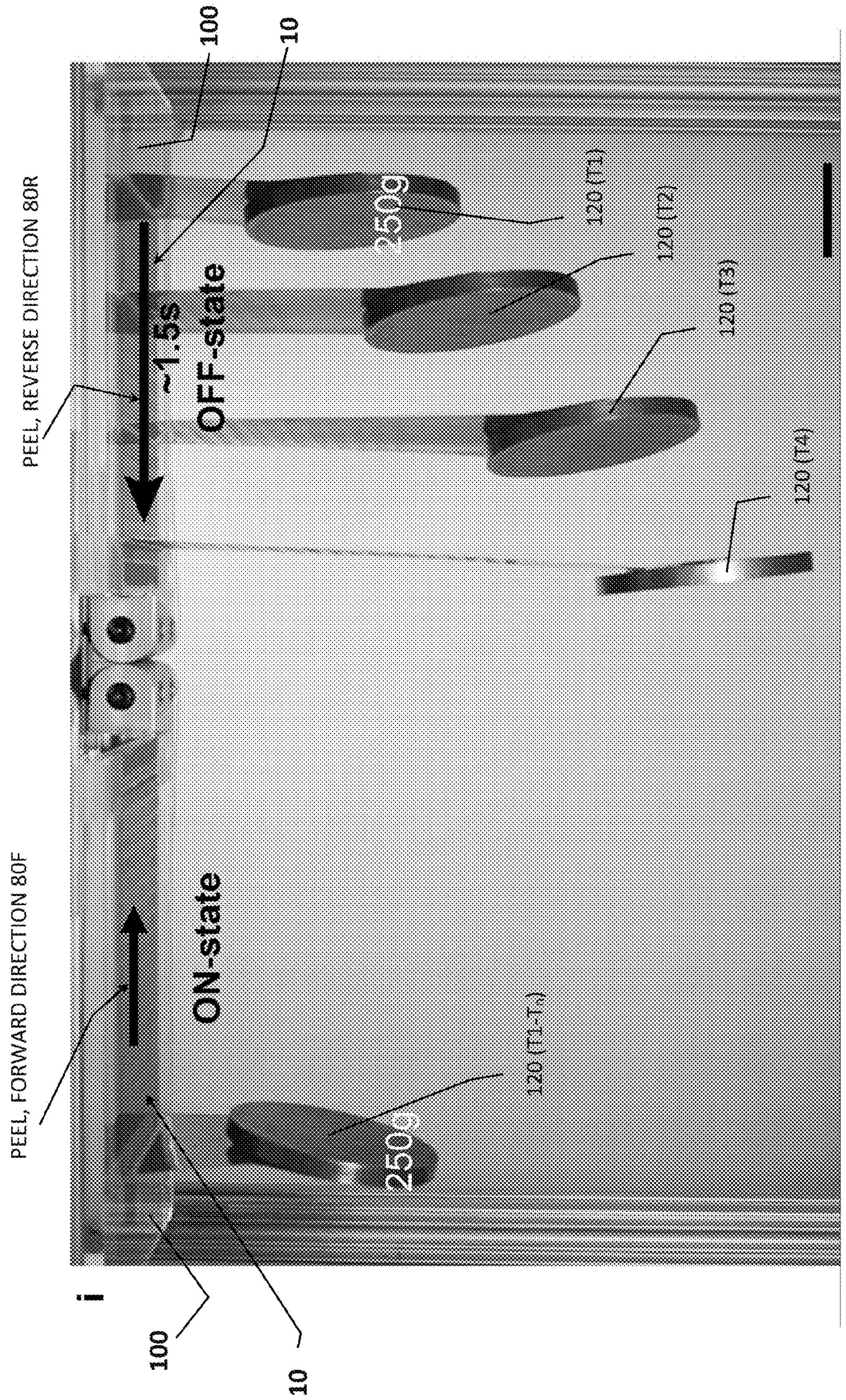

FIGS. 1A-I: High capacity, easy release kirigami-inspired adhesive. FIG. 1A: Photograph of a kirigami-inspired adhesive with a layout of rectangular patterns. FIG. 1B: an adhesive that peels in the direction of the on-state, enabling high adhesion. FIG. 1C: An adhesive that peels in the direction of the off-state, enabling easy release. FIG. 1D: A schematic illustration of the adhesion enhancement mechanism. FIG. 1E: A schematic illustration of the easy release mechanism. FIG. 1F: A representative peel force plot in two different states for an adhesive with $w_t$=46 mm, $w_{int}$=1 mm, $w_r$=5.43 mm, $l_r$=6 mm, $t_a$=0.12 mm, $t_b$=0.075 mm. FIG. 1G: Normalized adhesion enhancement $F_{ON}/F_{unpatterned}$ of adhesives with different cut designs (unpatterned, linear, triangular, rectangular), FIG. 1H: Normalized adhesion enhancement $F_{OFF}/F_{unpatterned}$ of adhesives with different cut designs (unpatterned, linear, triangular, rectangular), FIG. 1J: Directional switching ratio (SR) $F_{ON}/F_{OFF}$ of the four different adhesives, FIG. 1J: Photograph of kirigami-inspired adhesives with rectangular patterns. The same weights (250 g) are attached to each adhesive to demonstrate adhesive switching capacity.

Figure 2F:
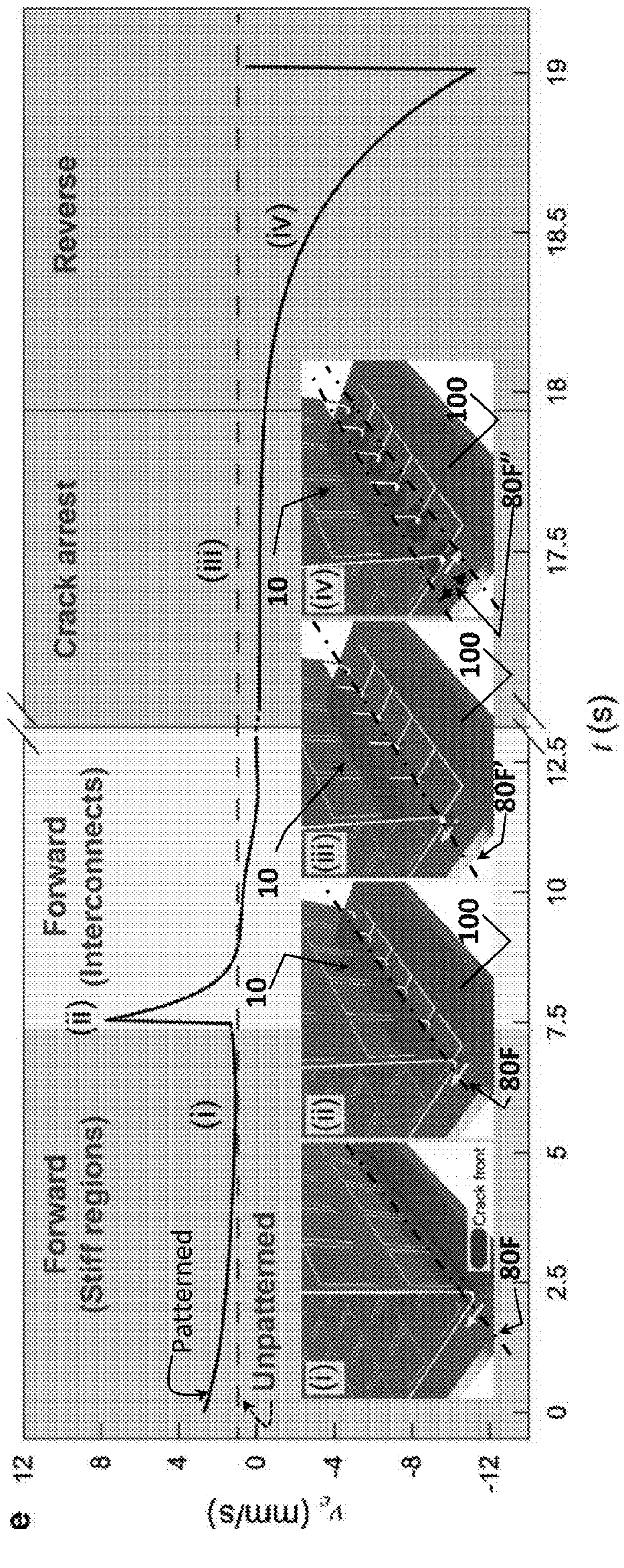

FIGS. 2A-F: Kirigami-inspired adhesive characterization. FIG. 2A: A schematic of a kirigami-inspired adhesive with geometric parameters. For all adhesives presented, $t_a$=0.12 mm, $t_b$=0.075 mm, $w_t$=46 mm, $w_{int}$=1 mm, unless otherwise noted. For adhesives with $t_b$=0.075 mm, $F_{ON}$ is relatively constant when s is larger than 2 mm (FIG. 2D). Therefore, adhesion values $F_{ON}$ in FIGS. 2B, C, and E are the average values calculated over a range of s (3-6 mm). FIG. 2B: On-state adhesion $F_{ON}$ versus $w_r/2$ and $N_r$ with varying $l_r$ (4 mm, 6 mm, and 8 mm). FIG. 2C: Contour plot of the adhesion values $F_{ON}$ of the kirigami adhesive with rectangular patterns as a function of the width $w_r$ and length $l_r$ of the rectangular pattern. FIG. 2D: F versus $l_r$ of with design of $w_r$=5.43 mm in two different states. FIG. 2E: $F_{ON}$ versus spacing s for varying thickness of the backing layer $t_b$. The inset shows the $F_{ON}$ as a function of $t_b$. The red curve is a scaling law: $F_{ON}{\sim}t^{0.5}$. FIG. 2F: Plot of relative displacement $\delta_{relative}$ of a kirigami-inspired adhesive versus time.

FIG. 2F summarizes principles of this embodiment including showing how the adhesive crack front is dramatically modified in the 'on' state. Here the crack travels forward, arrests, and then travels in reverse, which enhances adhesion of the non-linear (patterned) cuts versus no-cuts (unpatterned).

FIGS. 3A-E: Digitized spatial programming of cut patterns into an adhesive. FIG. 3A: Scheme for digital fabrication of adhesives with programmed adhesive properties. FIG. 3B: Normalized on-state adhesive peak force $F_{ON}/F_{unpatterned}$ versus the fill factor $(N_r, w_r)/w_{total}$. FIG. 3C: On-state adhesive peak force versus the number of rectangular patterns per width $N_r$. FIG. 3D: Work of adhesion $W_{ad}$ (black data points) and work of adhesion multiplied by the area $W_{ad}\delta A$ versus the number of rectangular patterns per area $N^2$.

$$N_r^2.$$

Figure 3E:
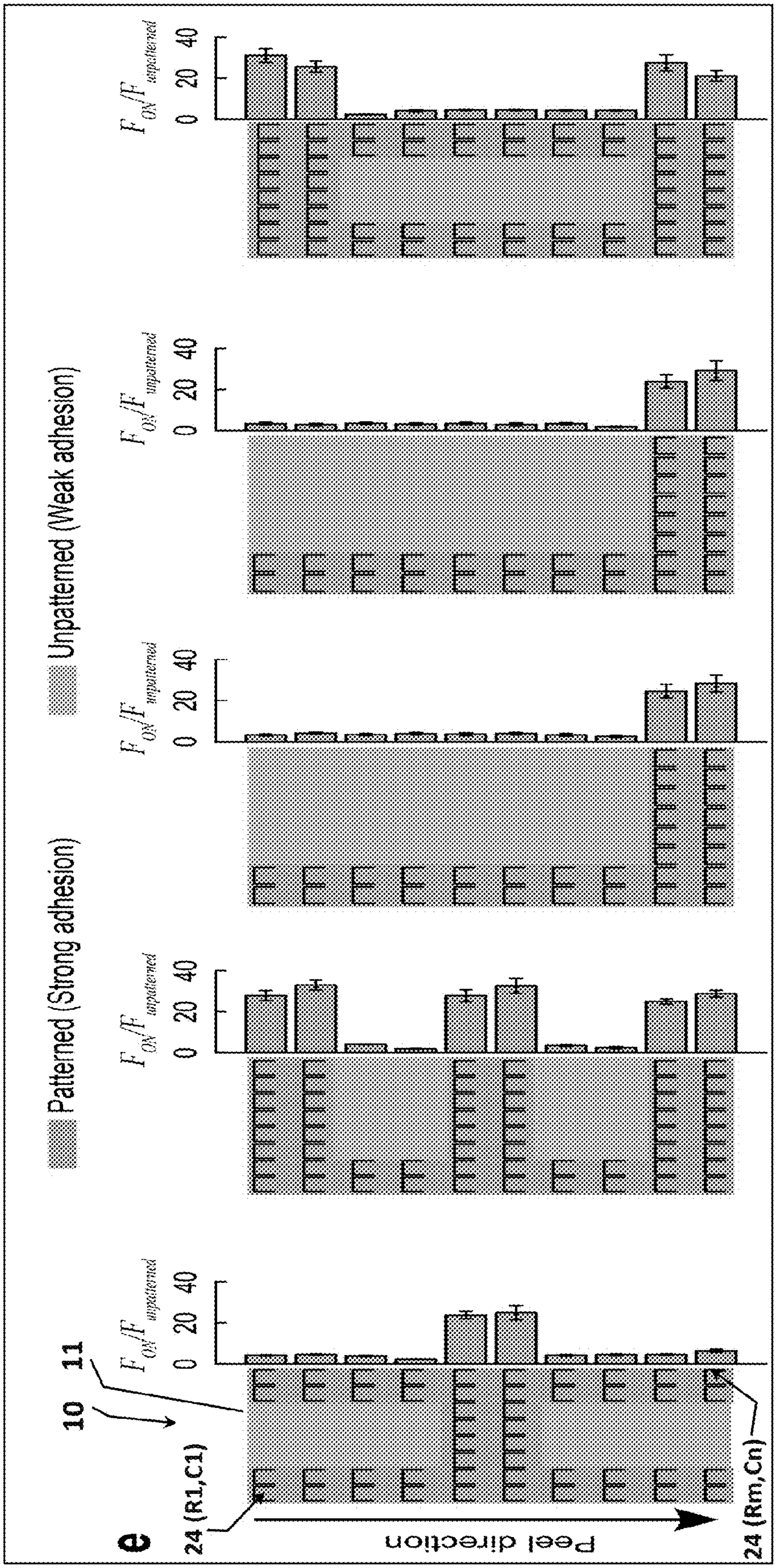

FIG. 3E: Demonstration of the spatially programmed cut patterns in the letters of "Hello".

FIGS. 4A-B: Programming adhesion directionality. FIG. 4A: Schematics of a layout of programmed adhesion in an adhesive with 8 regions in each peel direction and the corresponding design. FIG. 4B: a plot of measured on-state adhesive peak force as a function of programmed on-state adhesive peak force.

Figure 9:
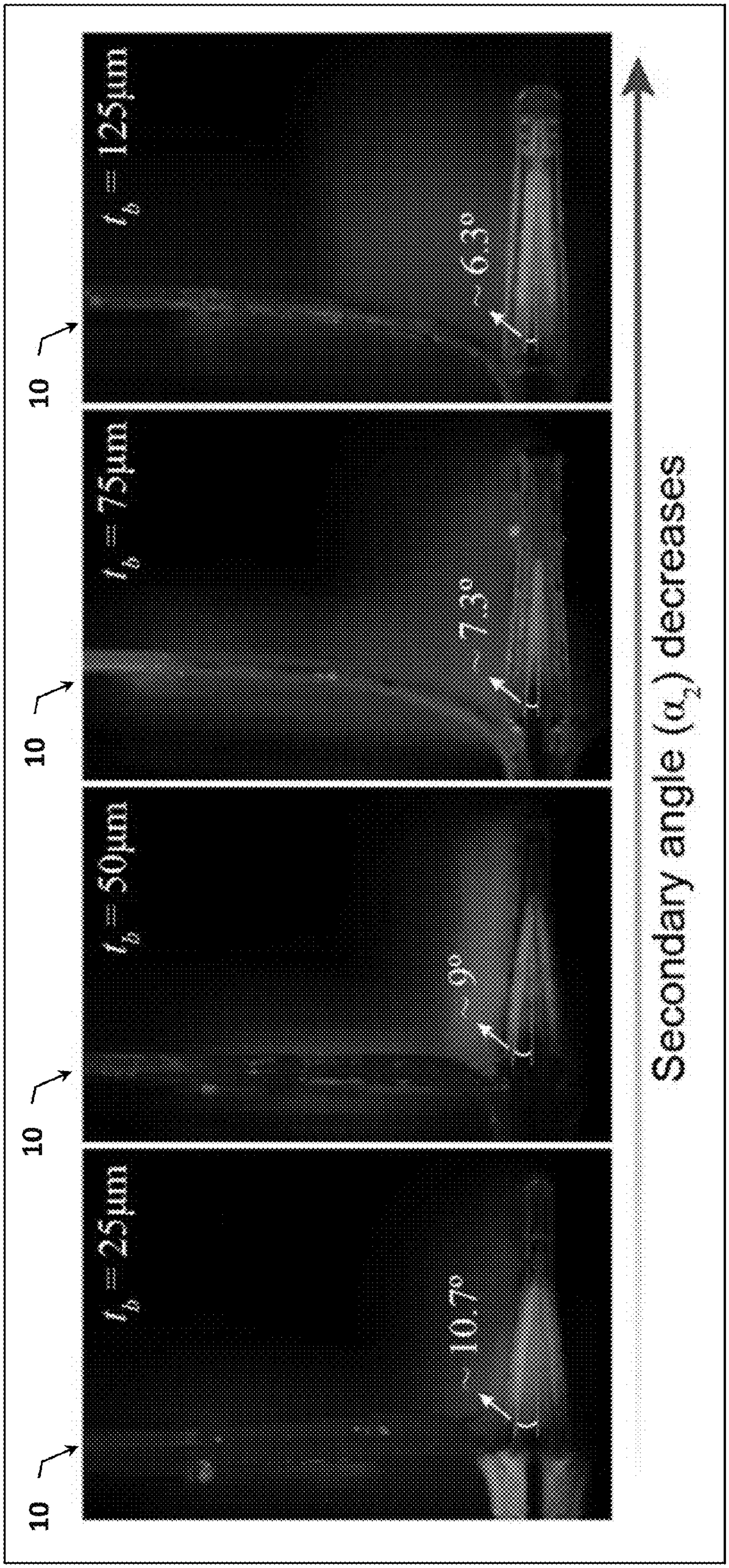
FIG. 9 is highly magnified images illustrating adhesive properties and concepts according to aspects of the invention at different secondary peel angles in a peeling direction.

FIG. 9. Illustrates further aspects according to the invention for further understanding as shown via annotated photographs. The local peel angle is measured by viewing the peel front from the side. As the adhesive debonds the crack gets arrested at the flap feature. To re initiate the debonding the crack must go in the reverse direction. As this occurs the secondary peel angle, defined as the local angle between the adhesive and the substrate, becomes significantly less than the global peel angle. Further, as the film thickness increases this secondary peel angle decreases. For a given adhesive, as the peel angle decreases the force required for debonding increases. This relationship results in an increased peel force for non-linear cut designs.

Figure 10:
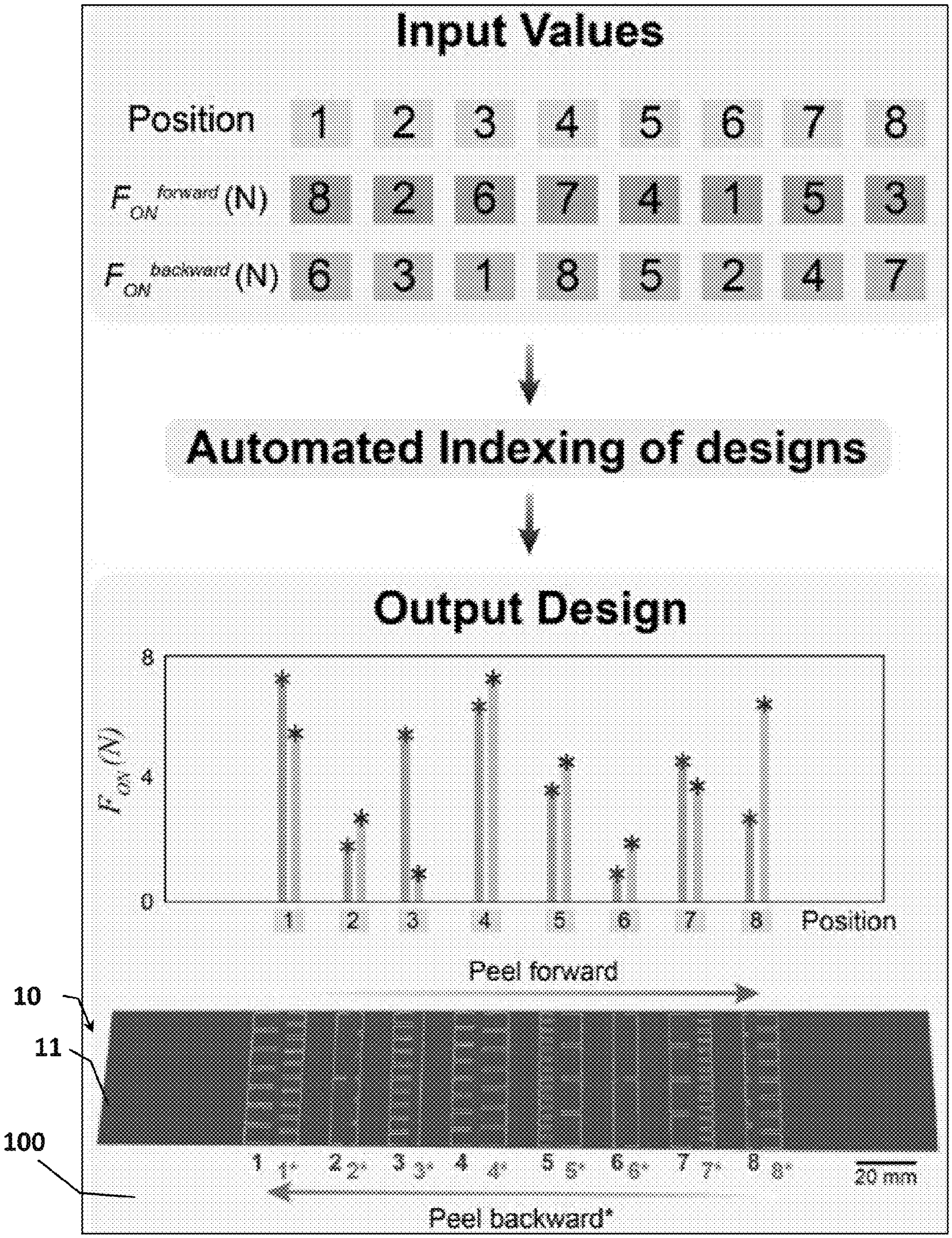
FIG. 10 is a further illustration of programmability of adhesive properties according to aspects of the invention.

FIG. 10. Illustrates further aspects according to the invention for further understanding as shown diagrammatically. Adhesives according to the invention can also be created through an automated process. In this case, we define spatial locations to control adhesion and then define the desired adhesion for each location. This can be done for one or both directions simultaneously. By utilizing a database that provides adhesive force for each given geometry, an automated software can utilize this database and provide the specific adhesive cut geometry for the prescribed adhesive force. Once a geometry is selected, the geometry can be populated into a design file and then the adhesive sheet can be rapidly fabricated to provide on-demand customization of adhesive force capacity as a function of position and direction.

Specific Example 2

Figure 5A:
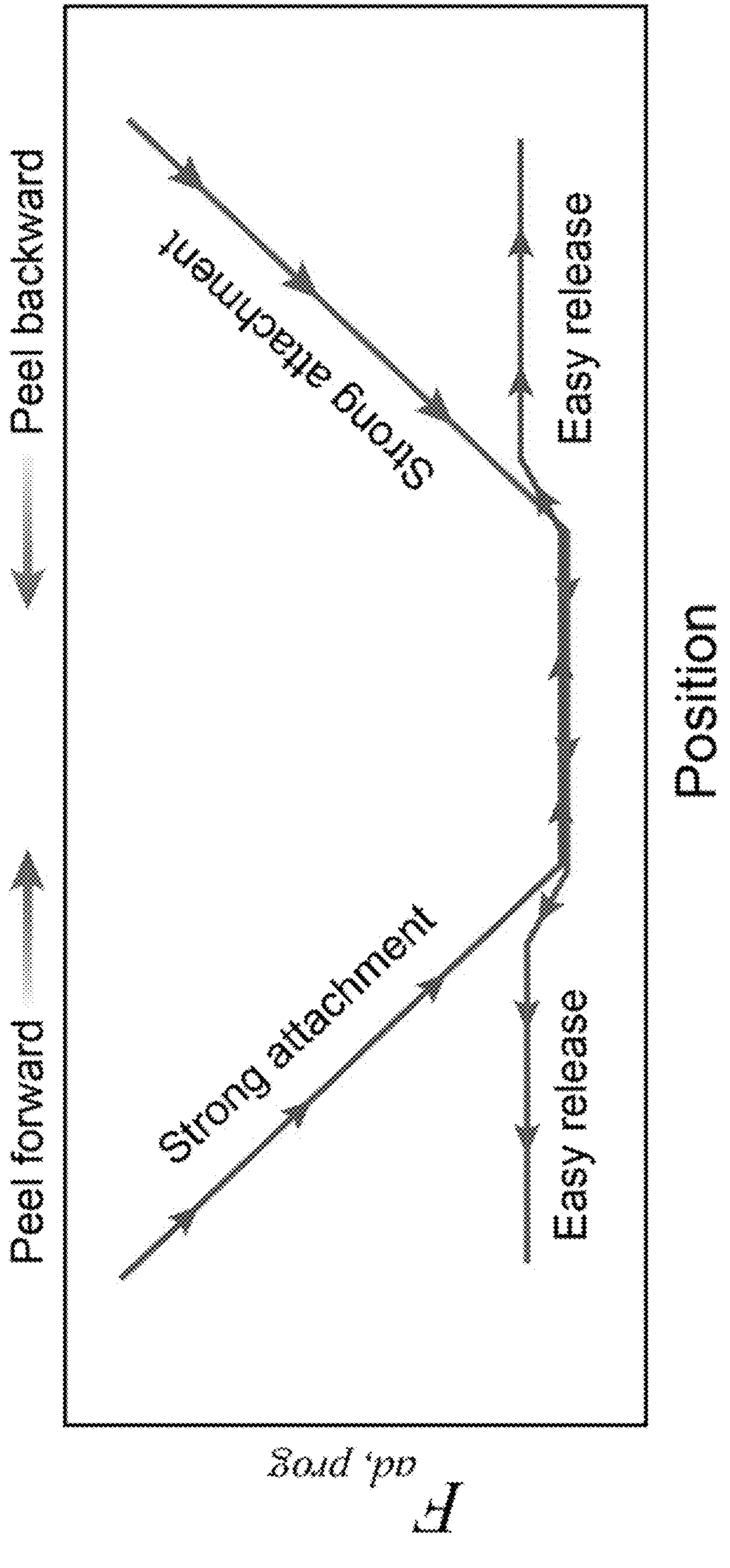
FIGS. 5A-B relate to a Specific Embodiment 2 according to the present invention, specifically embodiments patterned to allow adhesive properties in opposite peeling directions, but easy release in transverse directions.
Figure 5B:
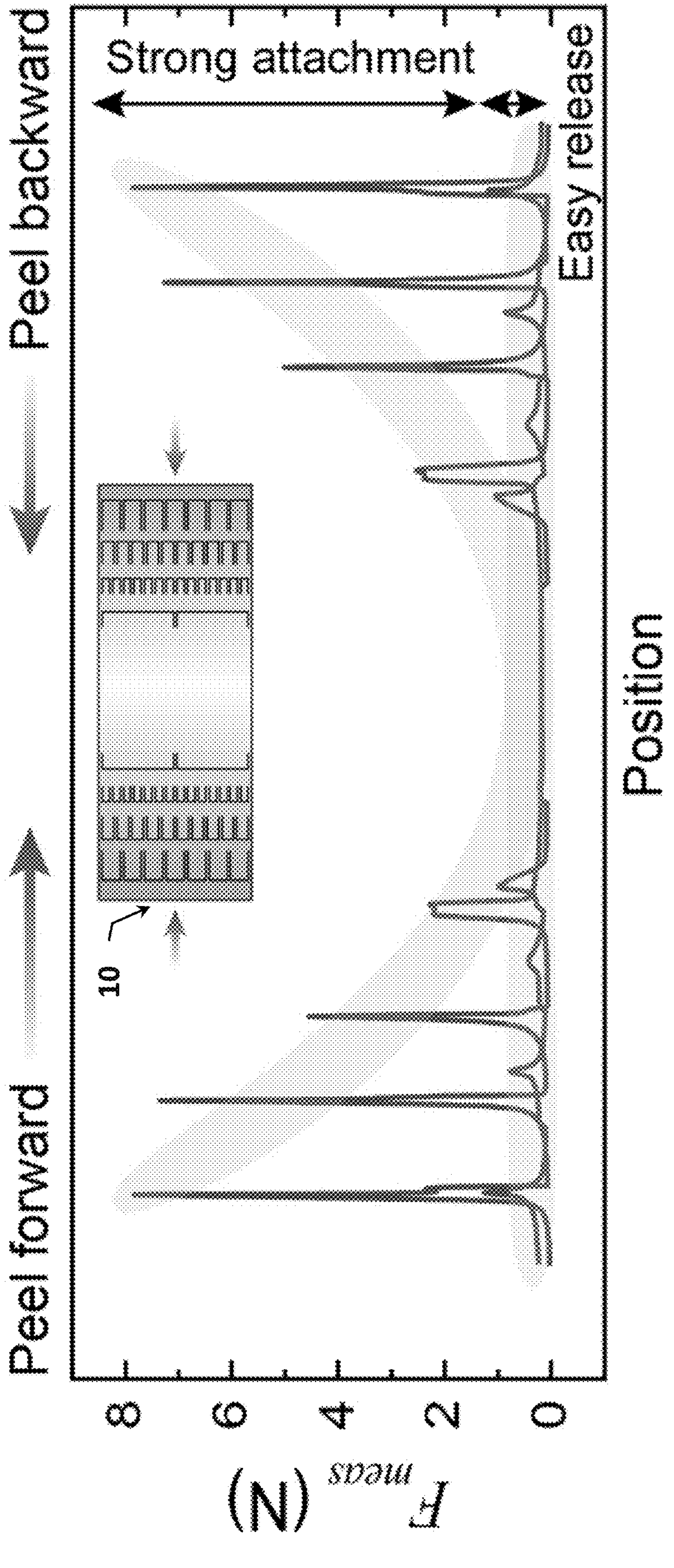

Another example is illustrated by the diagrams in FIGS. 5A and B. Using the concepts of Specific Example 1, the patterned regions could be configured where both ends are difficult to peel and then it becomes easier as the adhesive is removed all the way across, as demonstrated in these diagrams. Of course, variations based on the principles of the diagrams and variations discussed and described above and herein can be fabricated based on the designer's needs or desires.

Options and Alternatives

As mentioned earlier, the foregoing specific examples are not limiting of the invention, which is not restricted to those examples. Some of the alternatives for and options relative to the invention have been mentioned in Specific Example 1. Further non-limiting examples are as follows.

1. Characteristic Length

As described in Specific Example 1, for at least a specific strip structure, namely PET and PDMS, a characteristic length of approximately 3 mm is discussed. As indicated, this term is used to explain experimentally developed quantification/qualification of what appears to provide optimized benefit at least of certain parameters for a structure 10. This is the same characteristic length as in *ACS Applied Materials & Interfaces* 201810 (7), 6747-6754 and U.S. Ser. No. 16/748,442. It is to be understood, however, that a structure 10 according to one or more aspects of the invention can be designed to produce any one or more benefits even without achieving optimization.

For additional understanding, a few non-limiting examples of calculations indicating efficacy of use of non-linear cuts according to the invention at a variety of scales are as follows. As will be appreciated by those skilled in this technical area, this example shows applicability of the invention to very small size scales but a range of other scales.

As the thickness of the adhesive material decreases, we find that the feature size can decrease as the characteristic length ($l_{ch}$) decreases. For example, with the PET and PDMS adhesive a 75 μm thick layer gives $l_{ch}$ of ~3 mm, for a 1 mm thick PET $l_{ch}$~3 m, 1 μm thick gives $l_{ch}$ is ~5 μm, 100 nm thick gives $l_{ch}$ is ~170 nm, 10 nm thick gives $l_{ch}$ is 5.4 nm.

2. Strip Structure

As will be appreciated, the strip structure 10 and its constituent layers can vary from PET and PDMS respectively. In a broader sense, having a relatively inelastic layer to support the hinges and interconnects, and then an elastic or reusable adhesive layer as the direct interface to a target surface, can be implemented with a number of materials and variations. Some non-limiting examples are:

for the film or sheet with hinges and interconnects:
- a. polyethylene terephthalate (PET);
- b. polyimide;
- c. polyethylene or polypropylene;
- d. acetate film;
- e. polyvinyl chloride;
- f. paper;
- g. polylactic acid;
- h. metallized film; or
- i. fabric; and for the adhesive interface:
- j. polydimethylsiloxane (PDMS);
- k. polyurethane;
- l. acrylate-based material;
- m. block copolymer elastomer;
- n. thermal plastic elastomer;
- o. synthetic rubber; or
- p. natural rubber.

See also, *ACS Applied Materials & Interfaces* 2018 10 (7), 6747-6754 and U.S. Ser. No. 16/748,442.

Figure 6:
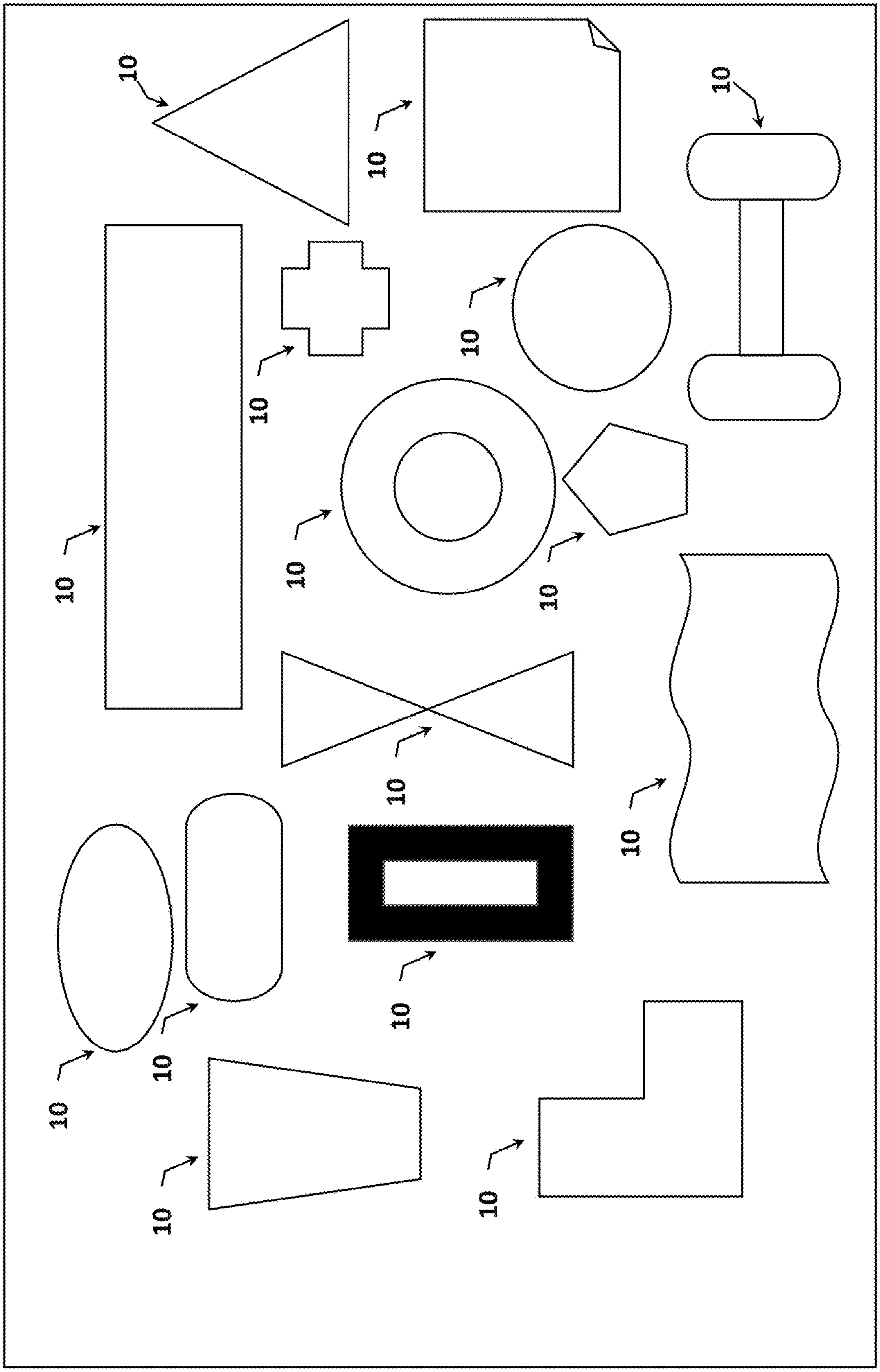
FIG. 6 is highly diagrammatical illustrations of non-limiting examples of the overall shapes of structures that could be made according to embodiments of the invention without showing non-linear patterned cuts for simplicity.

FIGS. 6 and 7A-D illustrate that in addition to the wide variations possible in the non-linear cuts, variations in the form factor of the overall adhesive structure 10 are of course possible. FIG. 6 diagrammatically shows a few non-limiting examples. The embodiments in earlier figures show a strip-like form factor (rectangular or square boundaries). But it is important to understand that it could be almost any shape. FIG. 6 shows rectangular, square, oblong, band-aid type, dog-bone type (like butterfly bandages), polyhedron, cross-shape, irregular shapes. Non-linear cuts are not shown for simplicity. But note, also that the forms do not have to be continuous inside the boundaries. For example, the frame and donut shapes illustrate that there could be areas removed interior of the outer boundaries.

FIGS. 7A-D specially show more of a patch shape than a strip. One non-limiting example can be applying the strip 10 to, e.g., human skin, or even by patterned human skin adhesive with the non-linear cuts according to aspects of the invention (see, e.g., FIG. 11).

FIG. 11 is included to demonstrate that the non-linear cuts according to the invention can be applied to a wide range of substrates, materials, or strips. As will be appreciated by those skilled in the art, the non-limiting examples of FIG. 11 include a specific combination of PET/PDMS, the material of commercially-available POST-IT® notes (3M Corporation—paper with a low-tack pressure-sensitive adhesive or PSA), commercially-available human skin adhesive MG-7 9900 (Dow Corning) (see, e.g., Product Information Healthcare Dow Corning® Soft Skin Adhesives (or SSA) Parts A & B Dow Corning® MG 7-9800 Soft Skin Adhesive Kit (A & B) Dow Corning® MG 7-9850 Soft Skin Adhesive Kit (A & B) Dow Corning® MG 7-9900 Soft Skin Adhesive Kit (A & B), 2015, September 28, Form No. 52-1128A-01 (copyright 2009 Dow Corning Corporation) available on-line on Jan. 19, 2021 (healthcare-plus.com.tw). See, also, FIG. 11 showing the further example of commercially-available Micropore™ medical tape (3M Corporation—a porous latex-free, hypoallergenic paper tape).

As will be understood by those skilled in the art, and as emphasized herein, embodiments according to the invention can be implemented with a wide variety of materials as substrates, strips, patches, or the like, both single layer or multilayer. Examples include a wide variety of materials that have some adhesive properties or capabilities. As discussed herein, some materials have adhesive properties just based on the material. Sometimes that depends at least partially on the type(s) of surfaces to which it is to be adhered. As discussed herein, some materials can have specific adhesive additions, layers, or materials added to another material/layer. FIG. 11 gives some examples, including some commercially-available products like Post-It® note materials and others indicated therein. Those materials are described sometimes as falling into a family of called pressure-sensitive adhesives (PSAs). But this is not limiting to what embodiments of the invention can be applied to or with.

3. Nonlinear Cuts

As mentioned, in its most general form, the term nonlinear is a cut that does not follow a straight line between its opposite termination points, in other words not a straight cut. As such, as illustrated by some of the examples in Specific Example 1, such nonlinear cuts could be of a variety of types. As a general rule, but a non-limitation, the nonlinear cut should normally define an area between a line between opposite cut terminating points, sometimes called a hinge line, and the remainder of the cut. In some places in this description that area is called a flap. Specific examples of rectangular and triangular cuts and flaps in regular polygonal shapes are given. But the cuts could be in other shapes, including non-regular shapes. A few non-limiting examples are as follows. We have made rectangles, triangles (with a wide range of internal angles). We could also have spherical or elliptical cuts, other polygons could work as well. As long as you could create a flap and a hinge it could work so the shape could be arbitrary or potentially even letters or numbers.

As will be appreciated, our individual cuts can be linear, but the combined cuts result in rectangular or triangular features (or others such as hybrid). The Figures, including FIGS. 1 G-H, give those skilled in the art an understanding that non-linear cuts can take a number of different overall shapes. Those shapes, and their size, can vary according to the size, thickness, and type of material in which they are patterned and the intended application.

4. Fabrication

FIG. 3A gives a highly diagrammatic to depiction of one technique using a digital modeling program to lay out the nonlinear cuts for the strip and then communicate the laser cutting instructions to a laser cutting subsystem to effectuate the same on the strip. Other techniques or possible. Non-limiting examples are die cutting, photolithography, scissors or other cutting tools, 3D or 4D printing. In some cases, it could even be some sort of a stamp that cuts out the nonlinear cuts in the desired pattern on the strip structure 10. Use of digital design and a controllable laser is beneficial for high flexibility in shape and location of the cuts as well as scale ability. See FIG. 8 for a diagrammatic depiction. U.S. Pat. No. 9,419,502 B2, incorporated by reference herein, provides background information on scalable fabrication, including examples of scalable fabrication of sheet form (single layer or multi-layer) with either subtractive (e.g. laser cutting) or additive (inkjet printing) processes. It gives examples of subtractive (e.g. laser cutting of sheet(s)) and additive (e.g. inkjet printing onto a sheet surface). It gives example of continuous processing (e.g. roll-to-roll). As will be understood, such processing could allow fabrication of an individual structure (e.g. a single long strip with non-linear cuts). But it can be scaled up to produce a plurality of adhesive structures (e.g. in a single roll of material a number of sub-areas of the material could be patterned and then the outer margin of each sub-section be cut to dice or singulate each individual patterned structure from the roll. Such dicing or singulation could be lengthwise of the roll, laterally across the roll, or both.

5. Programmability

Specific Example 1 gives a variety of examples. Geometric shape, size, and direction of cut can be adjusted or varied not only for adhesive properties but direction of adhesive properties relative to appeal direction. But further, pinpoint adhesive properties can be achieved by selecting only certain subregions in the patterned regions along the strip (See, e.g., FIGS. 3A-E). But further, as shown in FIGS. 4A-B, different size and direction cuts in the same patterned region a possible for different tunable adhesive effects.

Digital modeling and translation of the modeling to a highly controllable by resolution cutting subsystem are well known. See Specific Embodiment 1 for example of a commercially-available system and U.S. Pat. No. 10,435,590 B2, incorporated by reference herein, for a discussion of programmable laser cutting, including examples of digital programming and high resolution and precise patterns in materials for background information. Others are possible.

Figure 8:
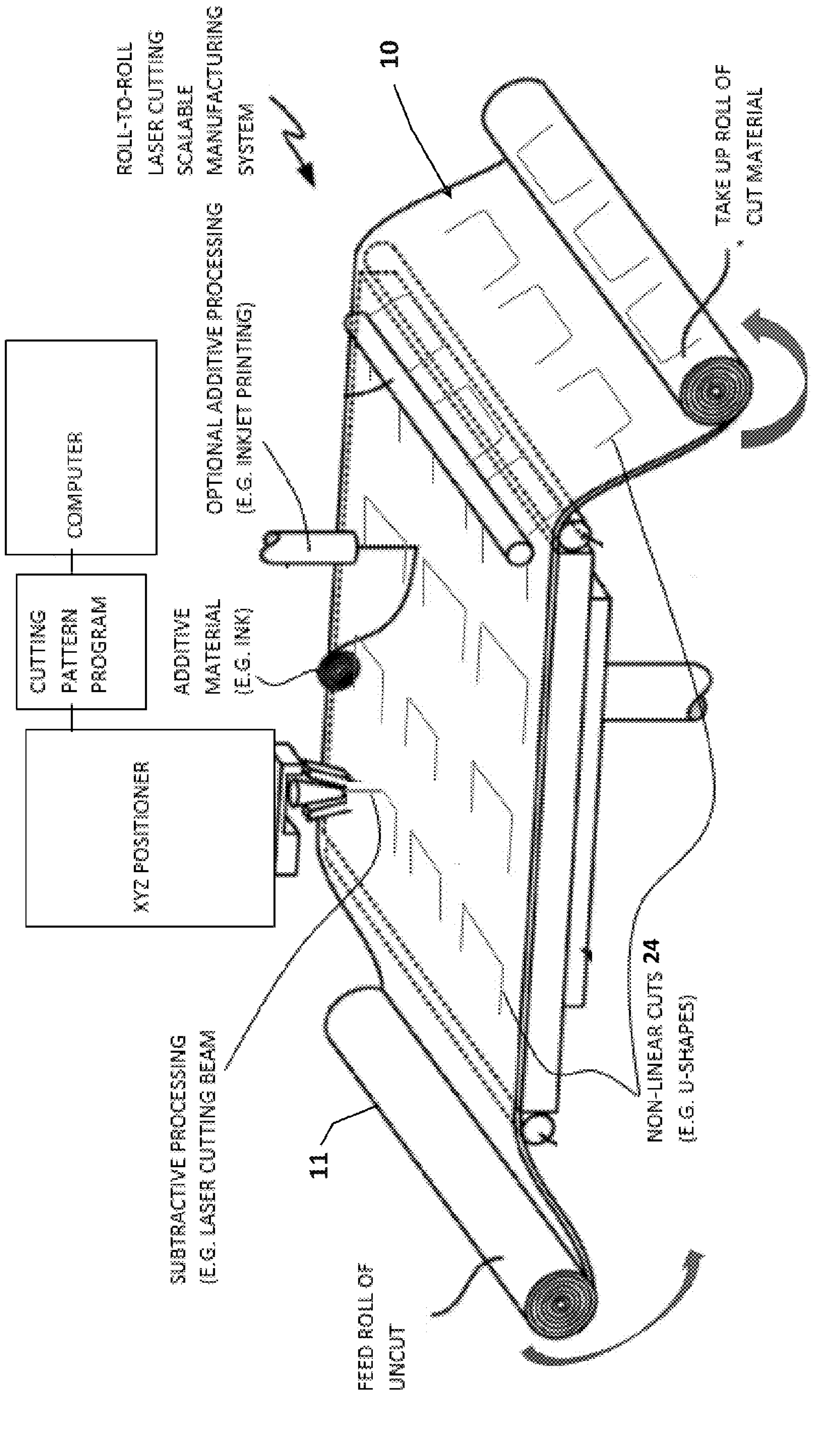
FIG. 8 is a highly diagrammatic illustration of one way for scalable, mass-production of exemplary embodiments according to the invention.

Importantly, using scalable fabrication techniques (examples given immediately above), a computerized system such as indicated in FIG. 8 could be programmed with a cutting pattern program to make non-linear cuts in the sheet(s) (which could be moved past the cutter or the cutter could be moved relative the material, or both). As mentioned above, the cutting could be of identical non-linear cuts across and along the material. But the ability to adjust a laser cutter (e.g. quick change of path via pattern programming and such things as an electro-mechanical XYZ positioner) would allow the non-linear cuts to vary quickly, including as material is moving. Thus, the same adhesive structure could be made along the length of the material. But different ones could be made, all facilitated by the programming.

6. Applications

The adhesive strip or structure 10 according to the invention could be used just for that, as an adhesive strip such as a bandage, patch, or even a note.

As indicated above, other functionalities could be added to the strip structure. Examples would be sensors, circuits, bio-monitoring patches, or other functionalities. See also *ACS Applied Materials & Interfaces* 2018 10 (7), 6747-6754 and U.S. Ser. No. 16/748,442. As will be appreciated by those skilled in the art, embodiments of the invention can be implemented as adhesive strips, patches, tape, or the like utilizing the non-linear patterned cuts. But at least some types of material using the non-linear patterned cuts can be a carrier for a variety of functionalities. A few non-limiting examples are mentioned above. Others are, of course, possible, depending on the nature of the material and what the functionality is.

It can therefore be seen that the invention achieves at least one or more of its stated objectives. The specific examples of all leveraged from the aspect of the invention of nonlinear cuts through a strip structure to take advantage of enhanced adhesive characteristics.

The invention claimed is:

1. A method of fabricating a reusable adhesive system with programmable adhesive properties for directional releasable adhesion to target surfaces in one or more peeling directions comprising:

a. providing a continuous strip structure comprising a flexible relatively inextensible layer with or without a relatively elastic layer on one side configured for direct releasable, reusable adhesion to target surfaces, the strip structure having a length along a longitudinal axis between front and reverse opposite ends, a width along a lateral axis between opposite lateral edges, and a thickness between opposite sides;

b. determining a desired adhesion strength spatially along the strip structure, c. programming the desired adhesion properties spatially into the strip structure by creating alternating patterned cut and unpatterned regions along the length of the strip by, in each patterned cut region, making a cut through the thickness of the strip structure in at least one sub-region between opposite lateral edges of the strip structure, the cut being non-linear relative the lateral axis between the opposite lateral edges of the strip and including:

i. opposite cut termination points along a hinge line; and ii. an intermediate non-linear cut section between the opposite cut termination points that does not cross the hinge line between opposite termination points of the cut;

iii. the opposite cut termination points and the intermediate non-linear cut section defining a flap area;

iv. the non-linear cut having a size, shape, and position dependent on type of material of the strip structure, the length, width, and thickness of the strip structure, and the adhesive properties of each of the at least one sub-region relative to the one or more peeling directions.

2. The method of claim 1 comprising a plurality of sub-regions for each patterned cut region.

3. The method of claim 1 wherein each of the plurality of sub-regions includes a non-linear cut.

4. The method of claim 1 wherein each of a subset of the plurality of sub-regions includes a non-linear cut.

5. The method of claim 1 wherein the intermediate cut section of the non-linear cut of each cut sub-section is closer to the reverse end of the strip structure than the front end of the strip structure.

6. The method of claim 5 wherein the strip structure provides adhesive switching of adhesive capacity in opposing peel directions, the adhesive switching comprising:

a. in an ON-STATE in a forward peel direction a crack front across unpatterned interconnects around the non-linear cuts proceeds at a high peel angle, is arrested at the tip of each non-linear cut at said interconnects, and travels back at an effective low angle, thus transitioning from the high angle peel mode in said interconnects to the low angle peel mode in the area of the non-linear cut comprising localized peel angle transition at the nonlinear cut; and b. in an OFF-STATE in a reverse peel direction, a crack front propagates along said interconnects and the area of the strip defined by the non-linear cut and continues forward without undergoing a shift in peel angles for easier release.

7. The method of claim 1 wherein each cut subsection further comprises an additional non-linear cut, and the non-linear cut of each cut sub-section is closer to the front end of the strip structure than the reverse end of the strip structure.

8. The method of claim 1 further comprising programming a spatial location of each of the non-linear cuts relative the strip and the shape, size, and direction of the non-linear cuts at each said spatial location.

9. The method of claim 1 wherein the hinge line of the cut is at least substantially in the direction of the lateral axis across the strip.

10. The method of claim 1 wherein the intermediate non-linear cut section of the cut is on a side of its hinge line closer to the reverse end than the front end of the strip.

11. The method of claim 1 wherein the intermediate non-linear cut section of the cut is on a side of its hinge line closer to the front end than the reverse end of the strip.

12. The method of claim 1 wherein each sub-region has an area and the flap area for the sub-region comprises a substantial amount of the sub-region area.

13. The method of claim 1 wherein the intermediate non-linear cut section is generally U-shaped with cuts at right angles to form a generally rectangular flap area with opposite generally linear and parallel side sub-sections extending generally in the direction of the longitudinal axis of the strip away from laterally spaced apart locations along the hinge line to a generally linear connecting sub-section spaced away from the hinge line and extending generally in the direction of the transverse axis of the strip.

14. The method of claim 1 wherein the intermediate non-linear cut section is generally V-shaped to form a generally triangular flap area with opposite generally linear and converging side sub-sections extending in the direction of the longitudinal axis of the strip away from laterally spaced apart locations along the hinge line to a flap peak spaced away from the hinge line.

15. The method of claim 1 wherein the intermediate non-linear cut section is generally polygonal-shaped to form a generally rectangular flap area from the hinge line to away from the hinge line, and a generally triangular flap area extending further away from the rectangular area.

16. The method of claim 1 wherein the intermediate non-linear cut section comprises a cut line forming a flap of:

a. a regular shape;

b. a combination of regular shapes;

c. an irregular shape;

d. a combination of irregular shapes;

e. a symmetrical shape relative an axis;

f. an asymmetrical shape relative an axis;

g. a cut line of sections of straight lines;

h. a cut line of sections of non-straight lines; or i. a cut line of a combination of sections of straight and non-straight lines.

17. The method of claim 1 wherein the intermediate non-linear cut section has at least two opposite generally side sub-sections to form a flap area extending along the longitudinal axis of the strip away from laterally spaced apart locations along the hinge line to a flap peak spaced away from the hinge line.

18. The method of claim 1 wherein at least one of the sub-sections of the non-linear cut is linear.

19. The method of claim 1 wherein at least one of the sub-sections of the non-linear cut is other than linear.

20. The method of claim 1 wherein the at least one sub-region between opposite lateral edges of the strip in a cut region of the strip comprises a plurality of said at least one sub-regions, each with a said cut, thereby creating plural said flap areas with said intermediate non-linear cut section closer to the reverse end of the strip than the front end of the strip.

21. The method of claim 20 wherein the plural flap areas are at least generally the same shape and the hinge lines of the plural flaps are at least generally co-linear across the width of the strip.

22. The method of claim 1 further comprising plural said alternating cut and interconnecting regions along the strip.

23. The method of claim 1 wherein the at least one sub-region of the cut region comprises plural sub-regions and each of the plural sub-regions extends in the same direction along the longitudinal axis of the strip.

24. The method of claim 23 wherein the cut of each plural sub-region is substantially the same.

25. The method of claim 23 wherein the cut of each plural sub-region is different.

26. The method of claim 1 wherein the at least one sub-region of the cut region comprises plural sub-regions and at least first and second of the plural sub-regions extend in opposite directions along the longitudinal axis of the strip.

27. The method of claim 26 wherein the cut of each plural sub-region is substantially the same.

28. The method of claim 26 wherein the cut of each plural sub-region is different.

29. The method of claim 1 wherein the cut region comprises at least two sub-regions and further comprising a second cut through the thickness of the strip which is non-linear relative the lateral axis between opposite later edges of the strip, the second cut having a hinge line adjacent the hinge line of the said cut, but is closer to the front end of the strip than the reverse of the strip.

30. The method of claim 1 wherein the strip comprises a layer of polyethylene terephthalate (PET).

31. The method of claim 1 wherein the strip comprising a laminate of an inelastic layer and an elastic layer.

32. The method of claim 31 wherein the elastic layer comprises polydimethylsiloxane (PDMS).

33. The method of claim 1 wherein the strip comprises:

a. a PET/PDMS laminate;

b. paper with a low-tack pressure-sensitive adhesive;

c. a pressure sensitive adhesive (PSA);

d. a soft skin adhesive; or e. a porous material with pressure sensitive adhesive.

34. The adhesive system of claim 1 wherein each said cut region along the longitudinal axis of the strip comprises a row of at least one cut region along the traverse axis of the strip, and each sub-region of each cut region comprises a column along the longitudinal axis of the strip; wherein each non-linear cut of a sub-region comprises a cut geometry having:

a. the following parameters:
  i. a strip width $w_t$;
  ii. a flap width $w_r$, and a flap length $l_r$;
  iii. a longitudinal spacing s comprising an interconnect length;
  iv. a transverse spacing $w_{int}$; and
  v. a strip thickness t; and
b. where the number of said non-linear cuts per said row $N_r$ is at least substantially $w_t = w_r \cdot N_r + w_{int}(N_r - 1)$).

35. The method of claim 1 wherein each said cut region along the longitudinal axis of the strip comprises a row of at least one cut region along the traverse axis of the strip, and each sub-region of each cut region comprises a column along the longitudinal axis of the strip; wherein each non-linear cut of a sub-region comprises a cut geometry having:

a. the following parameters:
  i. a strip width $w_t$,
  ii. a flap width $w_r$, and a flap length $l_r$;
  iii. a longitudinal spacing s comprising an interconnect length;
  iv. a transverse spacing $w_{int}$, and
  v. a strip thickness t, and
b. at least one of:
  i. $w_r/2$>a characteristic length $l_{ch}$;
  ii. $l_r$>a characteristic length $l_{ch}$,
  iii. s>a characteristic length $l_{ch}$.

36. The method of claim 35 wherein $l_{ch} \sim= 3$ mm.

37. The method of claim 35 wherein adhesive properties are tuned by selection of the parameters.

38. The method of claim 37 programmed for:

a. higher adhesive properties relative to a peel of the strip in the forward direction of the strip;
b. lower adhesive properties relative to a peel of the strip in the reverse direction of the strip;
c. adhesive properties relative to a peel of the strip in the forward direction of the strip is a function of one or more of:
  i. spacing s between rows of patterned sections; and
  ii. thickness of the film.

39. The method of claim 1 in combination with a functional component operatively mounted on the strip, the functional component comprising one of:

a. a biosensor;
b. an electrical or electronic circuit;
c. a chemical sensor;
d. bio-monitoring patches;
e. graphics;
f. bandages;
g. tape for adhering objects together; or
h. wall hanging.

* * * * *